US010599551B2

(12) United States Patent
Lu et al.

(10) Patent No.: US 10,599,551 B2
(45) Date of Patent: Mar. 24, 2020

(54) AUTOMATICALLY DETECTING DISTRIBUTED CONCURRENCY ERRORS IN CLOUD SYSTEMS

(71) Applicants: Futurewei Technologies, Inc., Plano, TX (US); The University of Chicago, Chicago, IL (US)

(72) Inventors: Shan Lu, Chicago, IL (US); Haopeng Liu, Chicago, IL (US); Guangpu Li, Chicago, IL (US); Haryadi Gunawi, Chicago, IL (US); Chen Tian, Union City, CA (US); Feng Ye, Mississauga (CA)

(73) Assignees: The University of Chicago, Chicago, IL (US); Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/668,469

(22) Filed: Aug. 3, 2017

(65) Prior Publication Data
US 2018/0046565 A1    Feb. 15, 2018

Related U.S. Application Data

(60) Provisional application No. 62/374,449, filed on Aug. 12, 2016.

(51) Int. Cl.
*G06F 11/36* (2006.01)
*H04L 12/24* (2006.01)
(Continued)

(52) U.S. Cl.
CPC ...... *G06F 11/3632* (2013.01); *G06F 11/3636* (2013.01); *H04L 41/0816* (2013.01);
(Continued)

(58) Field of Classification Search
CPC ............. G06F 11/3632; G06F 11/3636; G06F 11/3688; G06F 9/44505; H04L 41/0816; H04L 67/10; H04L 67/34
See application file for complete search history.

(56) References Cited

U.S. PATENT DOCUMENTS

2010/0169888 A1*  7/2010  Hare .................... G06Q 10/107
                                                                    718/102
2011/0219208 A1*  9/2011  Asaad .................... G06F 15/76
                                                                    712/12
(Continued)

FOREIGN PATENT DOCUMENTS

| CN | 103377128 A | 10/2013 |
|---|---|---|
| CN | 103645961 | 3/2014 |
| WO | WO-2004025514 | 3/2004 |

OTHER PUBLICATIONS

"International Application No. PCT/CN2017/096505, International Search Report dated Nov. 8, 2017", (Nov. 8, 2017), 11 pgs.

(Continued)

*Primary Examiner* — Lewis A Bullock, Jr.
*Assistant Examiner* — Mohammad H Kabir
(74) *Attorney, Agent, or Firm* — Schwegman Lundberg & Woessner, P.A.

(57) ABSTRACT

A method for detecting distributed concurrency errors in a distributed cloud computing system includes tracing operations that access objects in functions involving inter-process messaging, applying a set of happens-before rules to the traced operations. Analyzing the traced operations to identify concurrent operations that access a common object to generate a list of potential distributed concurrency errors (DCbugs). Pruning the list of DCbugs to remove DCbugs having only local effect and that do not generate run-time errors.

23 Claims, 10 Drawing Sheets

(51) Int. Cl.
*H04L 29/08* (2006.01)
*G06F 9/445* (2018.01)

(52) U.S. Cl.
CPC .......... *H04L 67/10* (2013.01); *G06F 9/44505* (2013.01); *G06F 11/3688* (2013.01); *H04L 67/34* (2013.01)

(56) References Cited

U.S. PATENT DOCUMENTS

| | | | |
|---|---|---|---|
| 2012/0151271 A1* | 6/2012 | Ganai | G06F 11/3612 |
| | | | 714/38.1 |
| 2012/0167162 A1* | 6/2012 | Raleigh | G06F 21/57 |
| | | | 726/1 |
| 2012/0278658 A1* | 11/2012 | Han | G06F 11/3636 |
| | | | 714/38.1 |
| 2013/0232118 A1 | 9/2013 | Reid et al. | |
| 2013/0275951 A1 | 10/2013 | Dolby et al. | |
| 2014/0359577 A1 | 12/2014 | Ceze et al. | |
| 2014/0380101 A1* | 12/2014 | Yu | G06F 11/3636 |
| | | | 714/38.1 |
| 2015/0019901 A1 | 1/2015 | Griffith et al. | |
| 2015/0134795 A1* | 5/2015 | Theimer | G06F 17/30563 |
| | | | 709/223 |
| 2016/0283345 A1* | 9/2016 | Gounares | G06F 17/00 |
| 2016/0306922 A1* | 10/2016 | van Rooyen | G06F 19/28 |
| 2017/0039371 A1* | 2/2017 | Lukacs | G06F 21/53 |
| 2017/0177737 A9* | 6/2017 | Hu | G06F 17/30958 |
| 2017/0242414 A1* | 8/2017 | Coote | H04L 67/025 |

OTHER PUBLICATIONS

"Chinese Application Serial No. 201780049079.9, Office Action dated Dec. 18, 2019", (w/ Concise Statement of Relevance), 10 pgs.

\* cited by examiner

AUTOMATICALLY DETECTING DISTRIBUTED CONCURRENCY ERRORS IN CLOUD SYSTEMS

RELATED APPLICATION

This application claims priority from U.S. Provisional Application Ser. No. 62/374,449 entitled "AUTOMATICALLY DETECTING DISTRIBUTED CONCURRENCY BUGS IN CLOUD SYSTEMS" and filed on Aug. 12, 2016, the disclosure of which is hereby incorporated by reference in its entirety.

STATEMENT OF GOVERNMENT SUPPORT

This invention was made with government support under NSF awards CNS1563956, CNS1514256, and CCF1439091. The government has certain rights in the invention.

TECHNICAL FIELD

The present disclosure is related to detecting execution errors in computing systems and, in particular, to detecting concurrency errors in systems distributed across multiple computing systems.

BACKGROUND

Many big data and cloud computing systems are implemented using distributed cloud systems having multiple program threads running in parallel across multiple servers. These systems include data management systems, multiplayer gaming systems, workforce collaboration systems (e.g. Sharepoint®, Slack® and HipChat® collaboration software) among others. These systems include software infrastructures such as scale-out storage, computing frameworks, synchronization services and cluster management services. The reliability of these distributed cloud systems is extremely important. Unfortunately these systems are subject to distributed concurrency errors (bugs), referred to herein as DCbugs. DCbugs may be difficult to detect due to the large state space of the distributed cloud systems and may manifest non-deterministically depending on the timing of distributed computation and communication.

SUMMARY

According to one aspect of the present disclosure, there is provided a method of detecting distributed concurrency errors in a distributed computing system including a plurality of component computers that comprises: tracing operations that access objects during execution of the distributed computing system to generate trace results; applying a set of happens-before rules to the trace results to identify candidate operations among the traced operations, each happens-before rule indicating a first type of operation that happens before a second type of operation; identifying respective concurrent pairs of the candidate operations that access respective common objects to generate a list of potential distributed concurrency errors; executing run-time analysis tools to identify conflicting memory accesses among the plurality of component computers that result in distributed concurrency errors.

Optionally, in any of the preceding aspects, the happens-before rules include message rules concerning messages between two nodes, thread rules threads initiated from different nodes, event rules concerning events accessed by different threads, and program ordering rules concerning execution order of operations in different threads.

Optionally, in any of the preceding aspects, the method further comprises identifying, as the candidate operations, respective pairs of the candidate operations from respectively different threads that access the respective common object and include at least one write operation.

Optionally, in any of the preceding aspects, tracing the operations that access objects includes exclusively tracing remote procedure call (RPC) functions, functions that conduct socket operations, and event handler functions.

Optionally, in any of the preceding aspects, the method further comprises: building an ordered graph of the candidate operations, each vertex in the graph representing one of the candidate operations and each edge between two vertexes in the graph representing a happens-before relationship between the operations represented by the two vertexes; and identifying a first one of the candidate operations as being concurrent with a second one of the candidate operations concurrent ones of the candidate operations after determining that the graph does not include a path from the first candidate operation to the second candidate operation.

Optionally, in any of the preceding aspects, the method further comprises: assigning a bit array to each vertex, each bit in the bit array representing a respective vertex in the graph; for each vertex, traversing the graph and setting one of the bits in the bit array corresponding to a target vertex upon reaching the target vertex during the traversal of the graph; and determining that the first and second candidate operations are concurrent when, for the bit array of the first candidate operation, the bit corresponding to the second candidate operation is not set.

Optionally, in any of the preceding aspects, the method further comprises analyzing each concurrent pair of candidate operations used to generate the list of potential distributed concurrency errors to delete, from the list, concurrent pairs of candidate operations that are unlikely to cause severe failures.

Optionally, in any of the preceding aspects, for each concurrent pair of candidate operations, the respective common object accessed by the concurrent pair candidate operations is located in a first node and the method further comprises analyzing one or more portions of the distributed computing system in which the concurrent pair of candidate operations occurs to determine whether a distributed concurrency error caused by out-of-order execution of the concurrent operations has an effect in a second node different from the first node.

Optionally, in any of the preceding aspects, the method further comprises modifying threads of the distributed computing system to determine a relative timing of each operation in each of the concurrent pairs of operations during execution of the distributed computing system to identify actual dynamic concurrency errors.

Optionally, in any of the preceding aspects, the method further comprises modifying threads of the distributed computing system to adjust relative timing of selected operations in the concurrent pairs of operations during execution of the distributed computing system to cause actual distributed concurrency errors in order to determine a timing sensitivity of the selected operations.

According to another aspect of the present disclosure, there is provided a computer readable medium comprising instructions, that, when executed by a processor, configure the processor to: trace operations in a distributed computing system that access objects during execution of the distributed computing system to generate trace results; apply a set of happens-before rules to the trace results to identify candidate operations among the traced operations, each happens-before rule indicating a first type of operation that happens before a second type of operation; identify respective concurrent pairs of the candidate operations that access respective common objects to generate a list of potential distributed concurrency errors; execute run-time analysis tools to adjust an order of occurrence for selected candidate operations in the concurrent pairs of candidate operations corresponding to each respective potential distributed concurrency error occur to confirm the distributed concurrency error.

Optionally, in any of the preceding aspects, the computer readable medium further comprises instructions that configure the processor to identify, as the candidate operations, respective pairs of the candidate operations from respectively different threads that access the respective common object and include at least one write operation.

Optionally, in any of the preceding aspects, the computer readable medium further comprises instructions that configure the processor to exclusively trace remote procedure call (RPC) functions, functions that conduct socket operations, and event handler functions.

Optionally, in any of the preceding aspects, the computer readable medium further comprises instructions that configure the processor to: build an ordered graph of the candidate operations, each vertex in the graph representing one of the candidate operations and each edge between two vertexes in the graph represents a happens-before relationship between the operations represented by the two vertexes; and identify a first one of the candidate operations as being concurrent with a second one of the candidate operations in response to determining that the first and second candidate operations are not connected in the graph.

Optionally, in any of the preceding aspects, the computer readable medium further comprises instructions that configure the processor to: assign a bit array to each vertex, each bit in the bit array representing a respective vertex in the graph; for each vertex, traverse the graph and set one of the bits in the bit array corresponding to a target vertex upon reaching the target vertex during the traversal of the graph; and determine that the first and second candidate operations are concurrent when, for the bit array of the first candidate operation, the bit corresponding to the second candidate operation is not set.

Optionally, in any of the preceding aspects, the computer readable medium further comprises instructions that configure the processor to analyze the concurrent pairs of candidate operations used to generate the list of potential distributed concurrency errors to delete, from the list, concurrent pairs of candidate operations that are unlikely to cause severe failures.

Optionally, in any of the preceding aspects, the computer readable medium further comprises instructions that configure the processor to, responsive to the respective common object accessed by the concurrent candidate operations being located in a first node, analyze one or more portions of the distributed computing system in which the concurrent pairs of candidate operations occur to determine whether a distributed concurrency error caused by out-of-order execution of the concurrent candidate operations has an effect in a second node different from the first node.

According to yet another aspect of the present disclosure, there is provided a method for processing components of a distributed computing system to identify distributed concurrency errors, the method comprising: generating a trace distributed computing system by insert trace commands into the distributed computing system, the trace commands tracing access to objects in RPC functions, functions that conduct socket operations and event handler functions; executing the trace distributed computing system to collect trace data; analyzing the trace data to build a graph having vertexes corresponding to operations that access the objects and edges corresponding to happens-before rules connecting the operations; analyzing the graph to identify candidate pairs of operations that potentially cause the distributed concurrency errors; modifying the distributed computing system to provide a distributed computing system having adjustable timing; and executing the distributed computing system having adjustable timing multiple times while adjusting the timing to identify which candidate pairs of operations produce actual distributed concurrency errors.

Optionally, in any of the preceding aspects, building the happens-before graph includes building a directed acyclic graph.

Optionally, in any of the preceding aspects, modifying the distributed computing system includes using at least one of a static bytecode analysis framework or a dynamic bytecode transformation framework.

According to yet another aspect of the present disclosure, there is provided an apparatus comprising: a processing unit coupled to a distributed computing system, the processing unit configured to: trace operations in the distributed computing system that access objects during execution of the distributed computing system to generate trace results; apply a set of happens-before rules to the trace results to identify candidate operations among the traced operations, each happens-before rule indicating a first type of operation that happens before a second type of operation; identify respective concurrent pairs of the candidate operations that access respective common objects to generate a list of potential distributed concurrency errors; and adjust an order of occurrence for selected candidate operations in the concurrent pairs of candidate operations corresponding to each respective potential distributed concurrency error occur to confirm the distributed concurrency error.

Optionally, in any of the preceding aspects the processing unit is further configured to identify, as the candidate operations, respective pairs of the candidate operations from respectively different threads that access the respective common object and include at least one write operation.

Optionally, in any of the preceding aspects the processing unit is further configured to exclusively trace remote procedure call (RPC) functions, functions that conduct socket operations, and event handler functions.

Optionally, in any of the preceding aspects the processing unit is further configured to: build an ordered graph of the candidate operations, each vertex in the graph representing one of the candidate operations and each edge between two vertexes in the graph represents a happens-before relationship between the operations represented by the two vertexes; and identify a first one of the candidate operations as being concurrent with a second one of the candidate operations in response to determining that the first and second candidate operations are not connected in the graph.

Optionally, in any of the preceding aspects the processing unit is further configured to: assign a bit array to each vertex, each bit in the bit array representing a respective vertex in the graph; for each vertex, traverse the graph and set one of the bits in the bit array corresponding to a target vertex upon reaching the target vertex during the traversal of the graph; and determine that the first and second candidate operations are concurrent when, for the bit array of the first candidate operation, the bit corresponding to the second candidate operation is not set.

Optionally, in any of the preceding aspects the processing unit is further configured to analyze the concurrent pairs of candidate operations used to generate the list of potential distributed concurrency errors to delete, from the list, concurrent pairs of candidate operations that are unlikely to cause severe failures.

Optionally, in any of the preceding aspects the processing unit is further configured to, responsive to the respective common object accessed by the concurrent candidate operations being located in a first node, analyze one or more portions of the distributed computing system in which the concurrent pairs of candidate operations occur to determine whether a distributed concurrency error caused by out-of-order execution of the concurrent candidate operations has an effect in a second node different from the first node.

According to yet another aspect of the present disclosure, there is provided an apparatus for processing components of a distributed computing system to identify distributed concurrency errors, the apparatus comprising: a processing unit configured to: insert trace commands into the distributed computing system to generate a trace distributed computing system, the trace commands tracing access to objects in RPC functions, functions that conduct socket operations and event handler functions; cause the trace distributed computing system to execute to collect trace data; analyze the trace data to build a graph having vertexes corresponding to operations that access the objects and edges corresponding to happens-before rules connecting the operations; analyze the graph to identify candidate pairs of operations that potentially cause the distributed concurrency errors; modify the distributed computing system to provide a distributed computing system having adjustable timing; and cause the distributed computing system having adjustable timing to execute timing multiple times while adjusting the timing to identify which candidate pairs of operations produce actual distributed concurrency errors.

Optionally, in any of the preceding aspects the apparatus further comprises at least one of a static bytecode analysis framework or a dynamic bytecode transformation framework for modifying the distributed computing system.

Any one of the foregoing examples may be combined with any one or more of the other foregoing examples to create a new embodiment within the scope of the present disclosure.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The examples below describe a system, DCatch, for detecting DCbugs. DCatch predicts DCbugs by analyzing and monitoring the execution of distributed cloud systems. The DCatch system uses a set of "happens-before" rules that model the wide variety of communication and concurrency mechanisms used in real-world distributed cloud systems. Each example happens-before rule constrains two actions such that one happens before the other. Based on the set of happens-before rules, the example DCatch system builds run-time tracing and trace analysis tools to effectively identify concurrent and conflicting memory accesses in a distributed cloud system. Once these memory accesses are identified, the DCatch system employs static and dynamic tools to help prune false positives and to trigger DCbugs during testing.

Due to the importance of the subject matter handled by distributed systems, users of the systems expect high reliability, which unfortunately is challenging to guarantee due to the complexity of the inter-process communication software used by the systems.

Among all types of errors in distributed systems, distributed concurrency errors, referred to as DCbugs, are among the most troublesome. These errors are triggered by untimely interaction among nodes and could propagate resulting in further errors beyond one node. Previous studies have shown that DCbugs widely exist in real-world distributed systems, causing a wide variety of failure symptoms such as data corruptions, system crashes, and job hangs.

The materials below describe the DCatch system in the context of a distributed data management system. It is contemplated, however, that DCatch may be used in any distributed computing system including, without limitation, multiplayer gaming systems, workforce collaboration systems and systems providing web or cloud-based services. Furthermore, although the examples described below show the servers as being separate entities, it is contemplated that two or more of the servers may be implemented in a single machine, for example as virtual machines.

Figure 1:
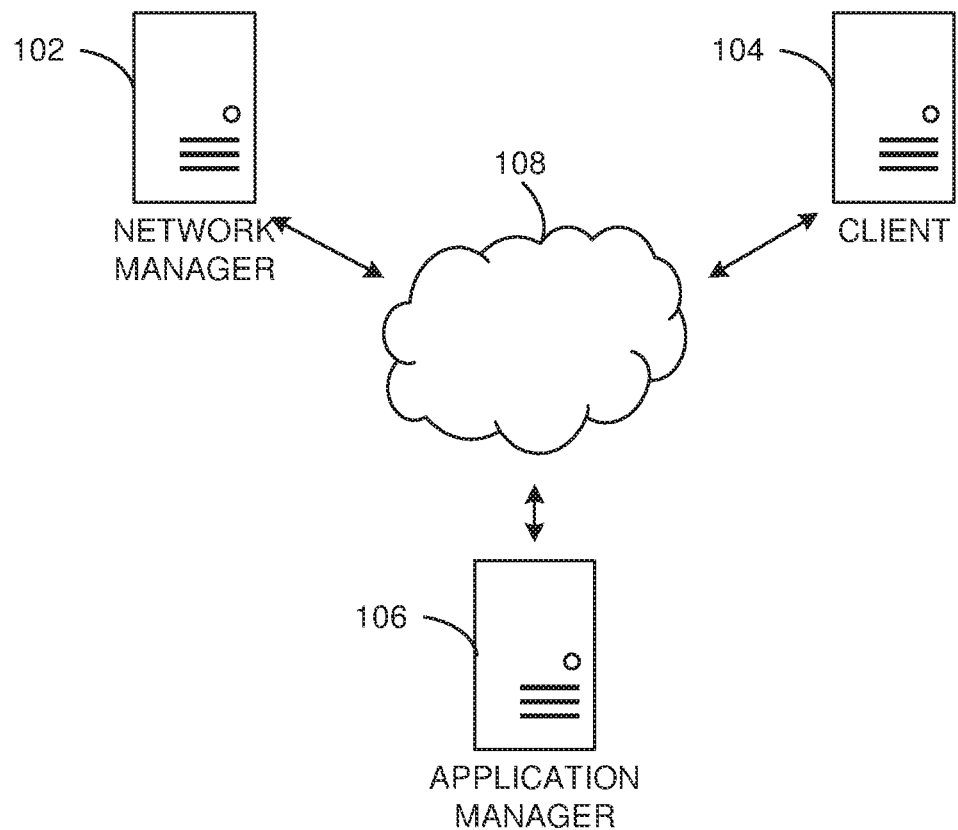
FIG. 1 is a block diagram of a simple distributed cloud system.

FIG. 1 is a block diagram of a simple distributed cloud system employing three servers a network manager 102, a client 104 and an application manager 106. The three servers communicate via a network 108 which may be a local area network (LAN), a wide area network (WAN), or a global communication network (e.g. the Internet). The example network may include both wired and wireless components.

Figure 2A:
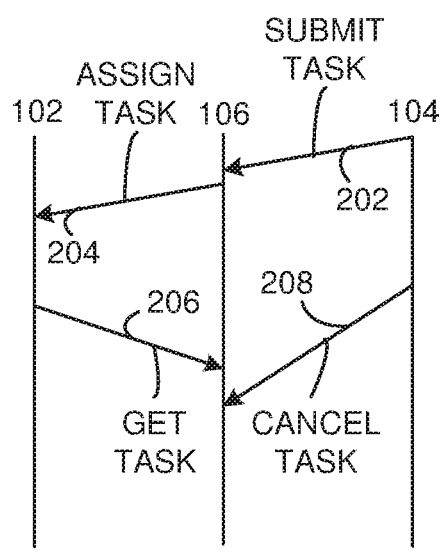
FIGS. 2A and 2B are timing diagrams that are useful for illustrating a distributed concurrency error.
Figure 2B:
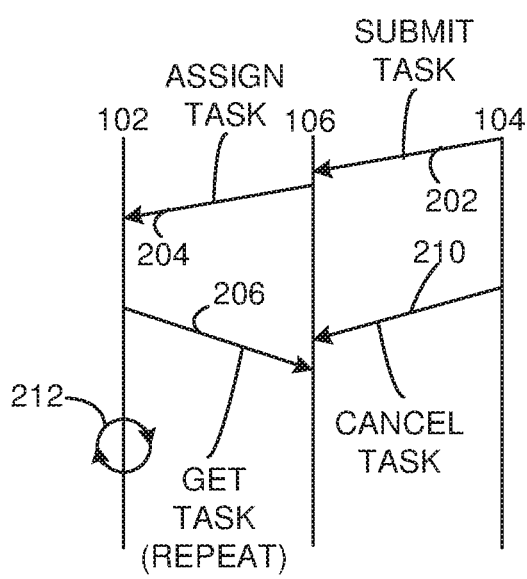

FIGS. 2A and 2B are timing diagrams that are useful for illustrating a distributed concurrency error. FIG. 2A illustrates a real-world example of distributed concurrency from Hadoop® MapReduce™. As shown, a thread running on the client 104 requests a task from the application manager 106 as shown by the arrow 202. The application manager 106 then assigns the task to a container in the network manager 102 as shown by the arrow 204. The network manager then retrieves the task from the application manager 106 as shown by the arrow 206. The client 104 cancels the task as shown by the arrow 208 after the network manager has been allowed access to the task. The example shown in FIG. 2A does not exhibit concurrency errors because the thread running on the network manager 102 accesses the task running on application manager 106 before the thread running on the client 104 cancels the task.

FIG. 2B shows a similar scenario which includes a distributed concurrency error (DCbug). In the example shown in FIG. 2B, the error is triggered by unexpected timing among node manager 102, application manager 106, and the client 104. After the application manager 106 assigns the task to the container in the network manager 102, the network manager container tries to retrieve the content of the task from application manager 106. At the time the retrieval request is delivered to application manager 106, however, the task has already been canceled upon a request from the client 104. Not anticipating this timing scenario, the network manager 102 container hangs, as indicated by the looping arrow 212, waiting forever for application manager 106 to return the task.

DCbugs are non-deterministic and, thus, may be difficult to find in the large state space of a distributed system spreading across multiple nodes.

There are only a few sets of approaches that tackle DC bugs including: software model checking, verification, verifiable language, and record and replay debugging. Although these techniques are powerful, they suffer from inherent limitations. Distributed system model checkers may be subject to state-space explosion and may take hours or even days to complete. Verification approaches require thousands of lines of proof to be written for every protocol; no verifiable language has yet been deployed, as low-level imperative languages are still popular for performance reasons. Record and replay techniques cannot help discover bugs until software fails. Furthermore these techniques are of limited effectiveness effective for debugging DCbugs because it is difficult to log all timing-related events across the distributed systems.

Local concurrency (LC) may be detected using dynamic bug-detection. In a nutshell, dynamic bug-detection techniques monitor and analyze memory accesses and synchronization operations to identify conflicting and concurrent memory accesses as local concurrency errors (LCbug) suspects. In this sense, "conflicting" means that multiple accesses are touching the same memory location with at least one write access. The term "concurrent" means that there is no happens-before causality relationship between accesses, and hence accesses can happen one right after the other in any order. These dynamic bug-detection techniques do not guarantee finding all bugs and often report many false positives. However, the LC techniques can be applied to large existing real-world systems implemented in popular languages, with limited annotation or code changes from the developers.

The example DCbug detection tools described below are guided by an understanding of DCbugs. DCbugs have fundamentally similar root causes to LCbugs: unexpected timing among concurrent conflicting memory accesses to the same memory location inside one machine. As described above with reference to FIG. 2B, for example, although the DCbug occurs due to triggering and error propagation among multiple nodes the fundamental problem is that an event handler running on the client 104 could delete the task concurrently with a remote procedure call (RPC) function reading the same entry. Developers do not expect this sequence of events.

The example DC bug detection tool abstracts the causality relationship in target systems into a few happens-before (HB) rules. An example of such an HB rule in multithreaded software is that thread creation "happens before" thread execution. These rules are followed to build an HB graph representing the timing relationship among all memory accesses in a target system; finally, all pairs of concurrent conflicting memory accesses are identified based on this HB graph.

DCbugs and distributed systems differ from LCbugs and single-machine systems in several aspects, which raise several challenges to DCbug detection.

First, DCbugs have a more complex timing relationship than LCbugs. Although root-cause memory accesses of DCbugs are in the same machine, reasoning about their timing relationship is complicated because the requests for access may come from different machines. Within each distributed system, concurrent memory accesses are conducted not only at the thread level but also at the node level and at the event level, using a diverse set of communication and synchronization mechanisms such as RPCs, queues etc. Across different systems, there may be different choices of communication and synchronization mechanisms, which are not always standardized as entries in a portable operating system interface (POSIX) thread library in multi-threaded software or in an Android event and/or in an inter-process communication (IPC) library in event-driven mobile apps. Thus, designing HB rules for real-world distributed systems is not trivial. Wrong or incomplete HB modeling may jeopardize both the accuracy and the coverage of DCbug detection.

A second challenge for detecting DCbugs is the larger scale of the systems and the errors. Distributed systems typically have a larger scale than single-machine systems. Distributed systems contain more nodes and collectively more dynamic memory accesses. A DCbug also operates on a larger scale than an LCbug. For example, the DCbug shown in FIG. 2B involves three nodes, client, application manager, and network manager, in its triggering and error propagation. The larger system scale poses scalability challenges to identifying DCbugs among a large number of memory accesses. The larger bug scale also benefits from new techniques to analyze and identify the DCbugs.

A third challenge concerns fault-tolerance. Distributed systems may include redundancy in order to tolerate component failures. The fault-tolerance design of distributed systems sometimes cures intermediate errors and sometimes amplifies errors, making it difficult to judge which errors are truly harmful.

Based on the above understanding of opportunities and challenges, an example DC bug detection tool, DCatch, is described below. There are two stages in the development of DCatch: first, generation of the HB model for DC bugs and second, the design of the components of DCatch.

The first step builds a HB model on which DCatch will operate. This model is based on a study of representative open-source distributed cloud systems. The example HB model includes a set of HB rules that cover inter-node communication, intra-node asynchronous event processing, and intra-node multi-threaded computation and synchronization.

After building the HB model, the next step is to build the DCbug-detection tool DCatch customized to address the unique challenges in detecting DCbugs. The DC catch tool includes four components: run-time tracing, off-line trace analysis, static bug report pruning, and DCbug testing and triggering.

The run-time tracer component traces memory accesses, event-queue operations, inter-node RPCs, socket communication, and other potentially conflicting memory accesses as the system runs. This component focuses on memory accesses related to inter-node communication and computation and helps the system to address the large-scale challenge in DCbug detection and allow the scaling of DCatch to large real-world distributed cloud systems.

The off-line trace analysis component analyzes the run-time traces to construct an HB graph for all recorded memory accesses following the HB model and reports all pairs of concurrent conflicting accesses (i.e., DCbug candidates). The key contribution in this stage is the construction of HB graph for the distributed system.

The static pruning module analyzes the program to determine the local impact and distributed impact of a DCbug candidate. This component helps to determine whether a particular DCbug candidate may be harmful, avoiding excessive false positives.

The DCatch bug-triggering module runs a modified version of the system that monitors and/or manipulates the timing of distributed execution according to the bug report, while considering the diverse concurrency and communication mechanisms in distributed systems. This module helps trigger true bugs and further prunes false positives.

As described above, the DCatch Happens-Before (HB) Model is based on an analysis of multiple distributed cloud data processing systems. A goal of the HB model is to abstract a set of happens-before rules that may be applied to a variety of distributed cloud systems. Every rule R represents one type of causality relationship between a pair of operations, o, in these systems, a rule is denoted as $o1 \stackrel{R}{\Rightarrow} o2$. These rules are based on the timing relationship between any two operations o1 and o2. Specifically, a set of HB rules may be identified to chain o1 and o2 together (e.g. $o1 \stackrel{R}{\Rightarrow} oo1 \stackrel{R'}{\Rightarrow} oo2 \ldots ook-1 \stackrel{R'}{\Rightarrow} o2$) when it is known that o1 must happen before o2, denoted as $o1 \Rightarrow o2$. If neither $o1 \Rightarrow o2$ nor $o2 \Rightarrow o1$ is true, o1 and o2 are concurrent and hence can execute side by side in any order. The set of HB rules is desirably comprehensive and precise to allow DCatch to accommodate the complicated timing relationship in distributed systems such as the one shown in FIG. 3 and achieve good bug detection accuracy and coverage.

Figure 3:
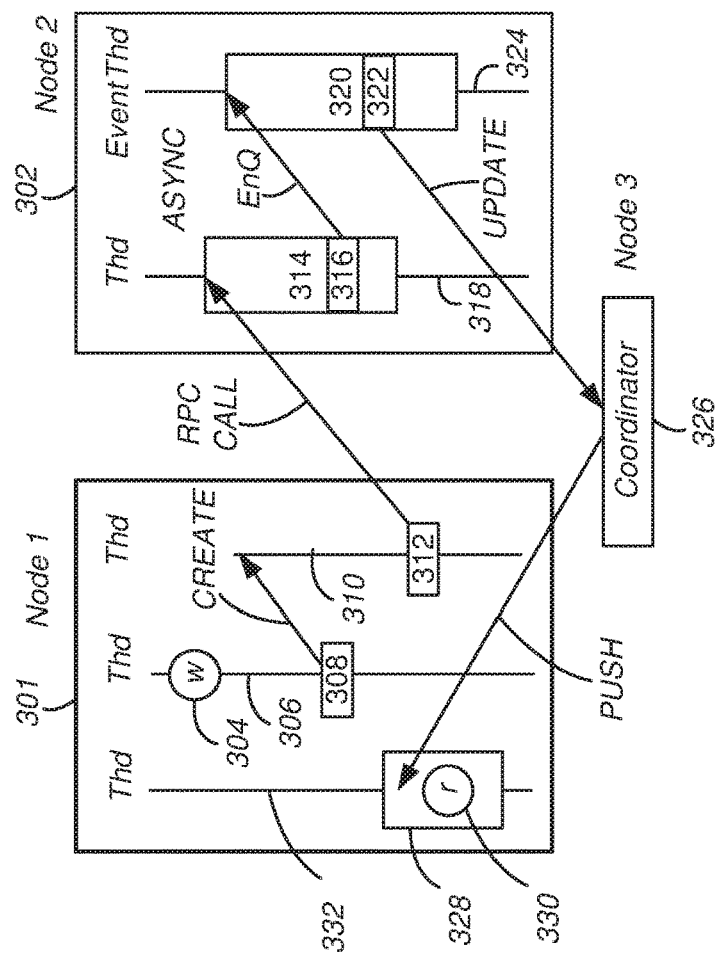
FIG. 3 is a timing diagram of another distributed cloud system.

FIG. 3 is a timing diagram of a distributed cloud system including multiple threads running on multiple nodes. In node 1, 301, a method running on thread 306 performs a write operation 304 to a system variable. At 308, the method creates a new thread 310, which executes a remote procedure call to start a method 314 in thread 318 running on node 2, 302. At block 316, the method 314 adds an event to an event handler 320 running on thread 324. The coordinator pulls the event 322 from thread 324 and pushes a notification to method 328 running in thread 332 of node 1. Method 328 executes a read operation 330 on the variable that operation 304 wrote. Because of the number of different threads and communication modes, it may be difficult to determine whether performing operation 330 before operation 304 will cause a distributed concurrency error (DCbug).

The examples below are derived from concurrency and communication mechanisms that encompasses representative real-world cloud systems, from which the HB rules were extracted.

Figure 4:
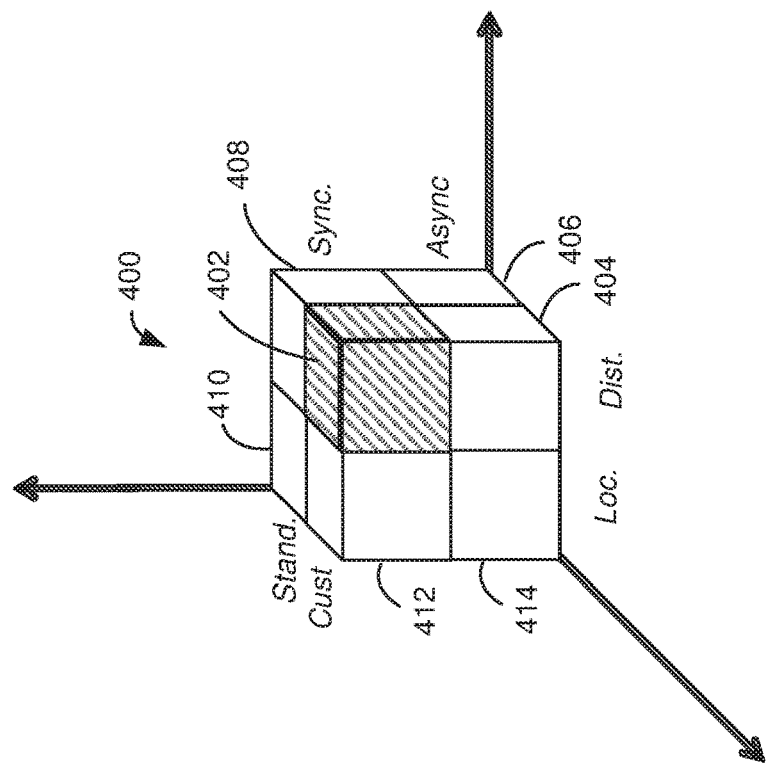
FIGS. 4 and 5 are state space diagrams showing different classifications of concurrency errors.
Figure 5:
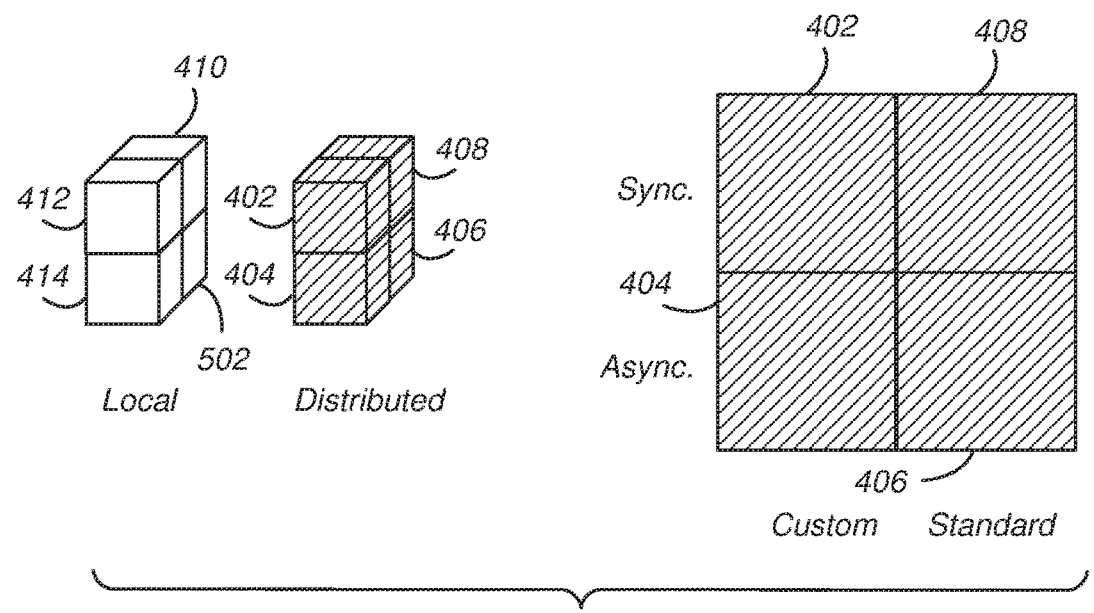

As described above, the HB concurrency rules may include rules for local concurrency errors (LCbugs) and distributed concurrency errors (DCbugs). Each of the LCbugs and DCbugs may be further divided into errors generated from synchronous and asynchronous operations and into errors generated from customized and standard operations. FIGS. 4 and 5 are state space diagrams showing different classifications of concurrency errors. FIG. 4 illustrates the partitioning cube where the shaded block 402 represents DCbugs caused by synchronized standard operations, block 404 represents DCbugs caused by asynchronous custom operations, block 406 represents DCbugs caused by asynchronous standard operations, and block 408 represents DCbugs caused by synchronous standard operations. For local concurrency errors (LCbugs), block 412 represents LCbugs caused by synchronized standard operations, block 414 represents LCbugs caused by asynchronous custom operations, and block 410 represents LCbugs caused by synchronous standard operations. Another block (not shown in FIG. 4) represents LCbugs caused by asynchronous standard operations. This partitioning of concurrency errors is further illustrated in FIG. 5 which uses the same numbering as FIG. 4 and shows block 502 representing LCbugs caused by asynchronous standard operations. The example DCatch tool focuses on the shaded blocks, 402, 404, 406 and 408 shown in FIG. 5 (i.e. distributed, synchronous and asynchronous, custom and standard operations).

Figure 6:
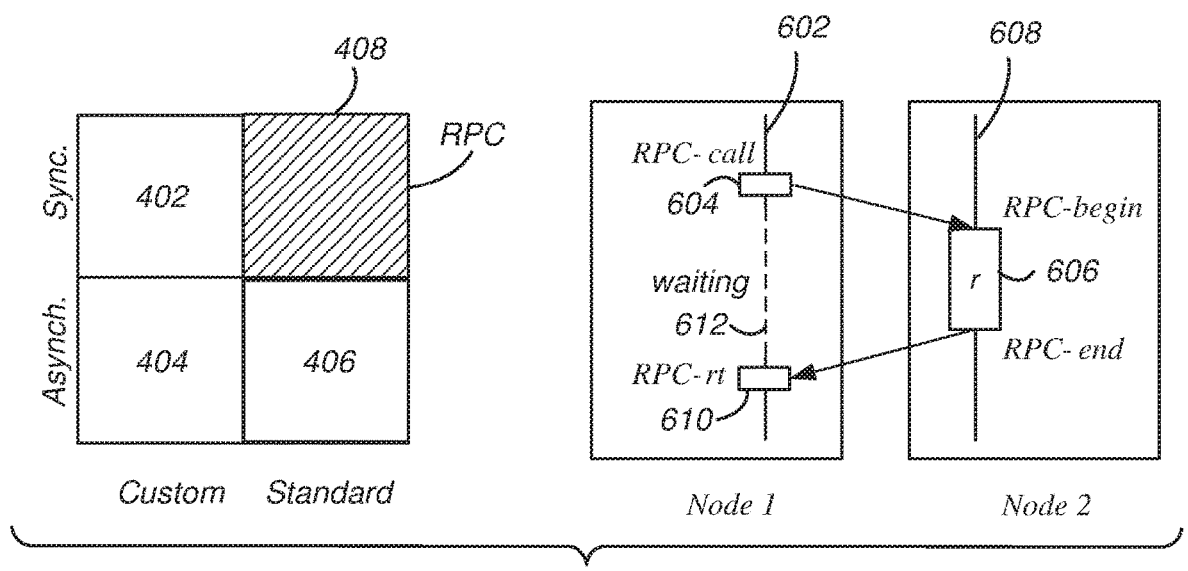
FIG. 6 is a state space diagram and timing diagram illustrating an asynchronous communication concurrency rule according to various embodiments.
Figure 7:
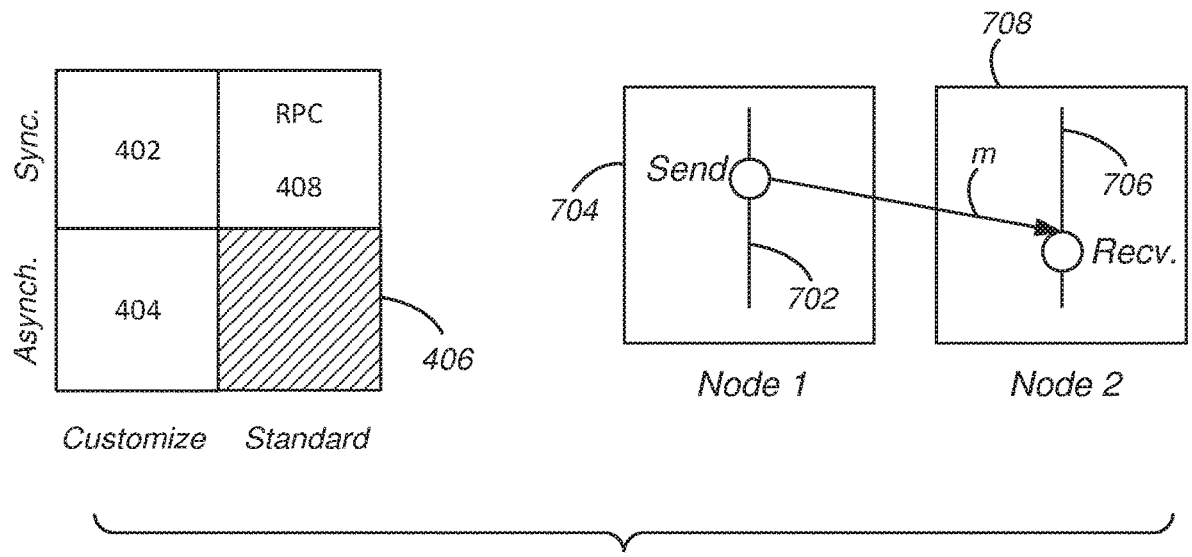
FIG. 7 is a state space diagram and timing diagram illustrating an RPC concurrency rule according to various embodiments.

Every distributed system involves multiple parallel-executing nodes that communicate with each other through messages, as exemplified in FIGS. 6 and 7. An analysis of inter-process messaging produces multiple message-related HB rules, referred to herein as Rule-M, based on different communication patterns.

FIG. 6 is a state space diagram and timing diagram illustrating an asynchronous communication concurrency rule. FIG. 6 illustrates a remote procedure call (RPC) which is a synchronized standard operation as shown by the shaded block 408. A thread 602 running on machine A calls an RPC function r (606) implemented in a thread 608 on machine B. Thread 602 waits (612) until thread 608 sends back the RPC execution result 610.

This communication pattern indicates the following HB rules. Making an RPC call r on node 1, denoted as Create (r, $n_1$), happens before the beginning of the RPC function execution in node 2, denoted as Begin (r, $n_2$). Furthermore, the end of the RPC function execution on node 2, denoted as End (r, $n_2$), happens before the return from the RPC call r in the RPC-calling node 1, denoted as Join(r, $n_1$).

Rule-$M^{rpc}$:Create$(r,n_1) \stackrel{M^{rpc}}{\Rightarrow}$ Begin$(r,n_2)$;

End$(r,n_2) \stackrel{M^{rpc}}{\Rightarrow}$ Join$(r,n_1)$

FIG. 7 is a state space diagram and timing diagram illustrating an RPC concurrency rule. FIG. 7 shows an asynchronous socket communication as illustrated by the block 406. A thread 702 in node 1 (704) sends a message m to a thread 706 in node 2 (708) through network sockets. Unlike RPC, the sender does not block itself. Instead, it can choose to block itself from listening to a socket for an incoming message. Clearly, the sending of message m happens before the receiving of m, resulting in the rule $M^{SOC}$.

$$\text{Rule-}M^{SOC}\text{:Send}(m,n_1) \xRightarrow{M^{soc}} \text{Recv}(m,n_2)$$

In addition to the above two types of basic communication mechanisms the examples below address two other types of high-level synchronization protocols among nodes. Each of these types of communication is implemented using a combination of RPC/socket communication and intra-node computation. Consequently, each communication type is assigned its own HB rules.

Figure 9A:
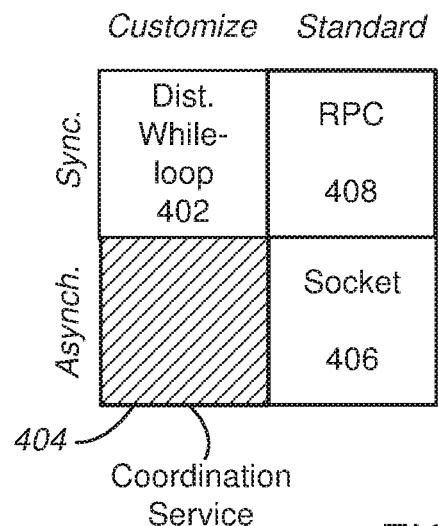
FIGS. 9A and 9B are a state space diagram and timing diagram illustrating a concurrency rule for communication among three systems.
Figure 9B:
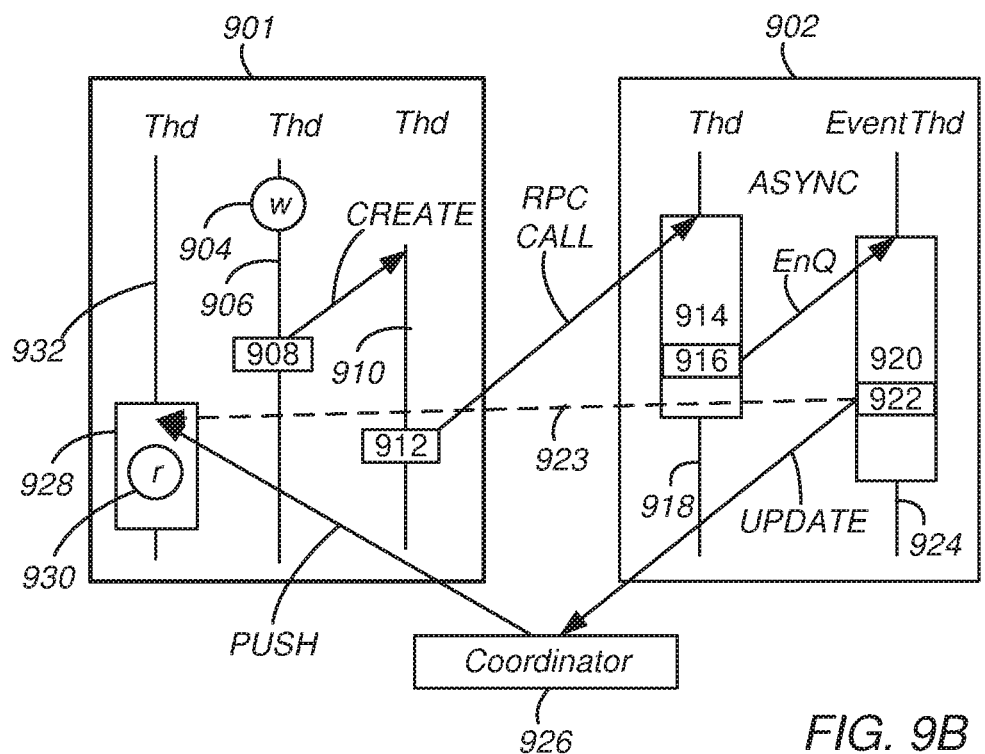

The first type of communication is push-based notification protocol, which is a customized asynchronous communication as shown by the shaded block in FIG. 9A. This communication is illustrated in FIG. 9B, which is described below in greater detail. For the push-based notification, a thread 924 in a node $n_1$ (902) updates an object, s, with a write operation, w, to a thread 932 in a dedicated coordination node $n_c$ (926) and $n_c$ notifies all related nodes, such as $n_2$ (901), about this update. Clearly, the update of s by $n_1$, denoted as Update (s, $n_1$), happens before the notification about the update is delivered at $n_2$ (901), denoted as Pushed (s, $n_2$). For example, HBase® nodes sometimes communicate through ZooKeeper™. ZooKeeper is a centralized service for maintaining configuration information, naming, providing distributed synchronization, and providing group services. In coordination systems similar to ZooKeeper, other programs register keys with the system and are notified of any changes associated with the key. HBase is a non-relational distributed database that may be used with the Hadoop distributed file system (HDFS). Hbase provides a mechanism for storing large amounts of sparse data.

In the first type of communication, a node registers a zknode with a specific path on ZooKeeper; ZooKeeper then notifies this node of all changes to the zknode from other nodes.

$$\text{Rule-}M^{push}\text{:Update}(s,n_1) \xRightarrow{M^{psh}} \text{Pushed}(s,n_2)$$

Note that, this rule is not redundant given Rule-$M^{rpc}$ and Rule-$M^{soc}$. Rule $M^{push}$ can be decomposed into three chains of causality relationship:

$$\text{Update}(s,n_1) \Rightarrow \text{Recv}(s,n_c); \quad (1)$$

$$\text{Recv}(s,n_c) \Rightarrow \text{Send}(s,n_c); \quad (2)$$

$$\text{Send}(s,n_c) \Rightarrow \text{Pushed}(s,n_2) \quad (3)$$

where $n_c$ is the node 926 which includes the ZooKeeper coordinator.

Chain (2) may be difficult to figure out, as it involves complicated intra-node computation and synchronization in $n_c$, which guarantees that every node interested in s gets a notification. Even for chains (1) and (3), there is no guarantee that Rule-$M^{rpc}$ and Rule-$M^{soc}$ can figure them out, because the communication among nodes $n_1$ (902), $n_2$ (901) and $n_c$ (926) often contains more than just one RPC/socket message.

Figure 8:
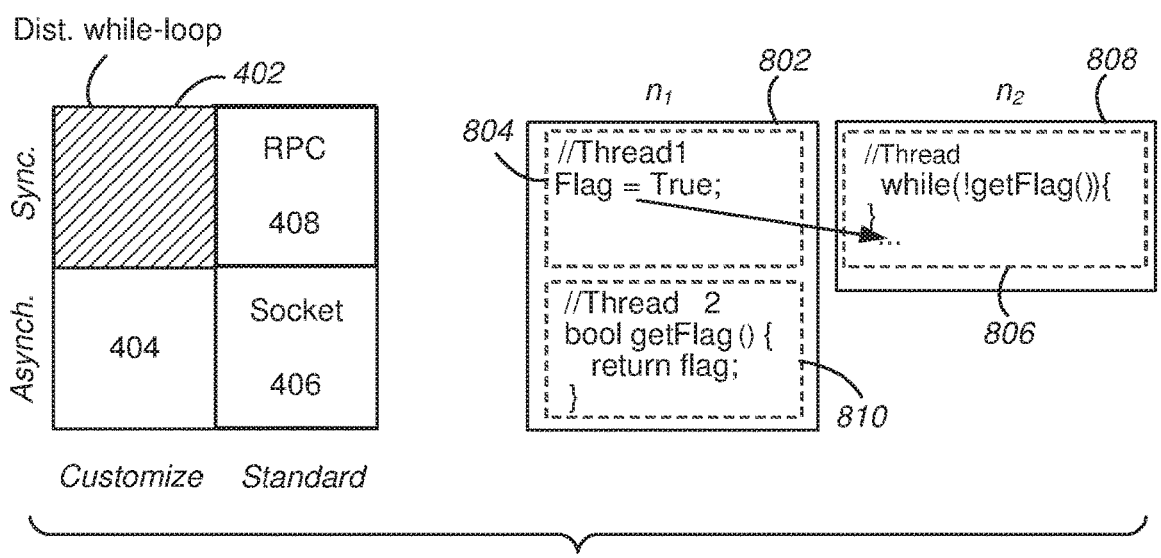
FIG. 8 is a state space diagram and timing diagram illustrating an inter-process communication concurrency rule according to various embodiments.

The second type of notification is a pull-based notification protocol. FIG. 8 is a state space diagram and timing diagram illustrating an inter-process communication concurrency rule. A thread 806 in node $n_2$ (808) keeps polling node $n_1$ (802) about a status object s (e.g. the state of the variable Flag) in $n_1$. Node $n_2$ does not proceed until it learns that s has been updated to a specific value by $n_1$. This HB rule may be abstracted as the definition of a status s in $n_1$ happening before the use of this status on $n_2$ (e.g. in thread 810). This type of synchronization occurs in Hadoop MapReduce and HBase.

$$\text{Rule-}M^{pull}\text{:Update}(s,n_1) \xRightarrow{M^{pul}} \text{Pulled}(s,n_2)$$

Again, this rule is not redundant given other HB rules, because of the complicated intra-node semantics in $n_1$. Traditional HB rules cannot establish the causality between s being set and s being read by an RPC function in another thread or being serialized into a socket message. This rule is similar to a distributed version of the while-loop custom synchronization in single-machine systems.

In addition to the messaging rules, it is useful to define rules for Intra-node concurrency and communication. Within each node, there may be multiple threads. FIGS. 9A and 9B are a state space diagram and timing diagram illustrating a concurrency rule for communication among three systems. As shown in FIG. 9B, some of these threads (e.g. 918) are dedicated for running RPC function implementations; some (e.g. 924) are event handling threads; and some (e.g. 906 and 932) are regular threads for example, threads in single-machine multi-threaded software. These DCbugs are generated by asynchronous custom operations as illustrated by shaded block 404.

The creation of a thread t in the parent thread, denoted as Create(t), happens before the beginning of t, denoted as Begin(t). The end of a thread t, denoted as End(t), happens before the join of t in another thread Join(t).

$$\text{Rule-}T^{fork}\text{:Create}(t) \xRightarrow{T^{frk}} \text{Begin}(t)$$

$$\text{Rule-}T^{join}\text{:End}(t) \xRightarrow{T^{jn}} \text{Join}(t)$$

Theoretically, there is another valid thread-related HB rule: condition-variable-notify happens before the exit of the corresponding condition-variable-wait. Condition-variable-notify and condition-variable-wait, however, are almost never used in the code regions that are related to inter-node communication and computation. As described above, the example systems detect DCbugs by analyzing inter-node communication and computation.

Finally, as described below, while the example DCatch system traces lock/unlock operations, DCatch does not address lock synchronization because locks are used to provide mutual exclusions, not strict ordering. However, as described below, DCatch may use lock/unlock operations to trigger some DCbug candidates. Knowledge of lock/unlock operations may be beneficial to avoid hangs when DCatch tries to manipulate the timing and trigger a DCbug candidate. Therefore, DCatch traces lock and unlock operations, including both implicit lock operations (i.e., synchronized methods and synchronized statements) and explicit lock operations.

Many distributed systems conduct asynchronous event-driven processing, essentially creating concurrency inside a thread. Events may be put into a queue by any thread. A dispatcher thread is typically responsible for taking out events from a queue, and assigning them to event-handling thread(s), where pre-defined event handlers are executed. Clearly, the enqueue of an event e, denoted as Create(e), happens before the beginning of the handler-function of e, denoted as Begin(e).

$$\text{Rule-}E^{enq}\text{:Create}(e) \xRightarrow{E^{eq}} \text{Begin}(e)$$

For two events $e_1$ and $e_2$ from the same queue, the timing between their handling may depend on several properties of the queue: is the queue a FIFO queue? how many dispatching threads are there? how many handling threads are there? For many systems, all of the queues are FIFO and every queue has only one dispatching thread. Consequently, the handling of $e_1$ and $e_2$ is serialized when the queue containing $e_1$ and $e_2$ is equipped with only one handling thread, and is concurrent otherwise. The former type of queues are referred to as single-consumer queues. All the queues in Zookeeper and some queues in MapReduce are single-consumer queues. The handling of their events follows the following HB rule.

$$\text{Rule-}E^{serial}: \text{End}(e_1) \overset{E^{sri}}{\Rightarrow} \text{Begin}(e_2), \text{if}$$
$$\text{Create}(e_1) \Rightarrow \text{Create}(e_2)$$

where $e_1 \in Q$, $e_2 \in Q$, and Q is a single-consumer FIFO queue.

The described examples also employ rules for sequential program ordering. According to the classical happens-before model, if operation $o_1$ occurs before operation oz during the execution of one thread, $o_1$ happens before $o_2$. That is, the execution order within one thread is deterministic.

$$\text{Rule-}P^{reg}: o_1 \overset{P^{rs}}{\Rightarrow} o_2$$

if $o_1$ occurs before $o_2$ during the execution of a regular thread.

This happens-before rule holds only for threads that do not contain any intra-thread concurrency. In distributed systems, this rule does not hold for event handling threads and RPC threads. In these two types of threads, the above rule holds only when $o_1$ and $o_2$ are inside the same event handler function or RPC function.

$$\text{Rule-}P^{nreg}: o_1 \overset{p^n}{\Rightarrow} o_2$$

if $o_1$ occurs before $o_2$ during the execution of one event handler or one RPC function.

The above message, task, event and program (MTEP) rules constitute the DCatch HB model. By its formalism of different levels of concurrency, DCatch HB model allows the precise modeling of the timing relationship among two operations in real-world distributed cloud systems.

For example, for the real example demonstrated in FIG. 9B, it can be inferred that the write operation, w (904), occurs before the read operation, r (930), (i.e. w $\Rightarrow$ r), because of the following chain of happens-before relationship:

$$w \overset{p^s}{\Rightarrow} \text{Create}(t) \overset{T^{en}}{\Rightarrow} \text{Begin}(t) \overset{p^{rs}}{\Rightarrow} \text{Create}(\text{OpenRegion},$$
$$\text{HMaster}) \overset{M^s}{\Rightarrow} \text{Begin}(\text{OpenRegion}, \text{HRS}) \overset{p^{rs}}{\Rightarrow} \text{Cre-}$$
$$\text{ate}(e) \overset{E^{rs}}{\Rightarrow} \text{Begin}(e) \overset{p^{rs}}{\Rightarrow} \text{Update}(\text{RS} \ldots$$
$$\text{OPENED}, \text{HRS}) \overset{M^{ms}}{\Rightarrow} \text{Pushed}(\text{RS} \ldots \text{OPENED},$$
$$\text{HMaster}) \overset{p^{rs}}{\Rightarrow} r$$

With reference to FIG. 9B, this HB relationship translates to the write operation w (904 in thread 906) occurs before the create operation 908 that creates thread 910. The RPC call at 912 in thread 910, initiates procedure OpenRegion 914 in thread 918. OpenRegion 914, at 916 places event e into the event queue 922 in event handler 920 of thread 924. Event e is updated by coordinator 926 and then pushed to RS . . . Opened 928 which performs the read operation r (930). The operation of the coordinator 926 informs the method 928 in thread 932 of the event 922 in the event handler 920, as illustrated by the dashed arrow 923.

It is noted that, the example DCatch system intentionally ignores certain causality relationships in the distributed computing system that do not affect the overall goal of detecting DCbugs. For example, incoming RPC calls are actually first put into queue(s) before they are assigned to RPC threads. The Rule-$R^{rpc}$, however, abstracts away these queues that belong to RPC-library implementations. Also, an event dispatching process exists between the enqueuing of an event and the beginning of the event handling there exists an event dispatching process. This event dispatching process is also abstracted away in our Rule-$E^{enq}$. Furthermore, as described above, the example model does not consider condition-variable notify-and-wait causality relationship, because it is almost never used in the inter-node communication and computation part of distributed systems.

Figure 10A:
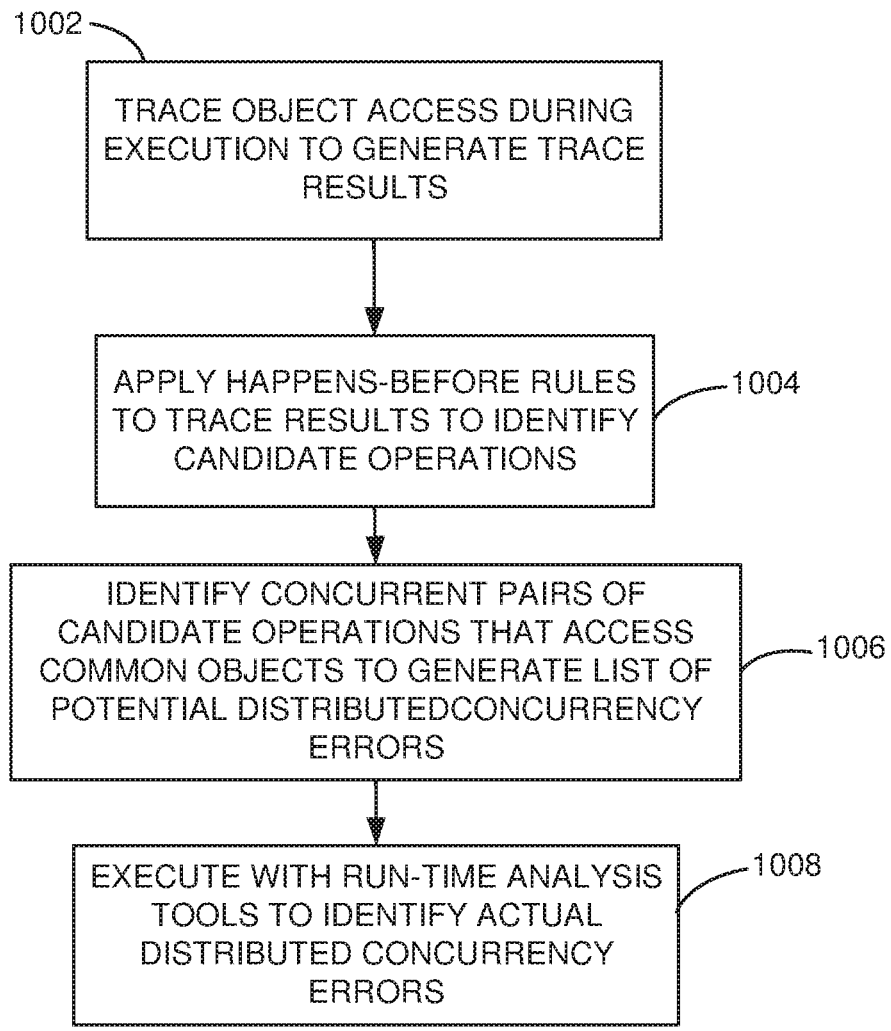
FIGS. 10A and 10B are flowchart diagrams of example systems for detecting concurrency errors according to various embodiments.
Figure 10B:
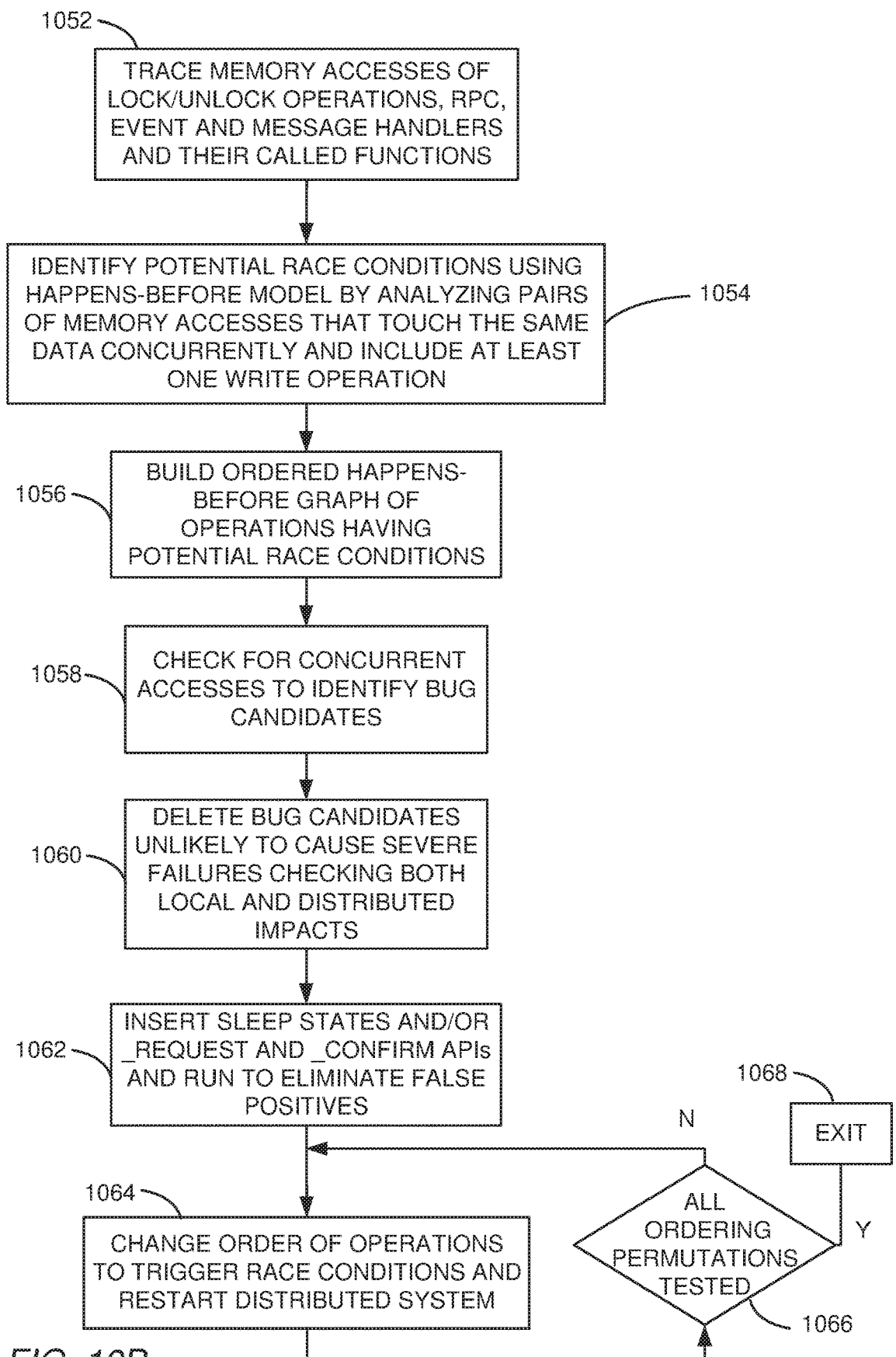

The materials below describe examples of the four components of DCatch based on the model and rules defined above. The four components include tracing, applying HB rules, triage to identify significant potential DCbugs, and triggering of the significant DCbugs. The example DCatch system is described with reference to FIGS. 10A and 10B. FIG. 10A is a flowchart diagram of an example system for detecting concurrency errors that shows the sequence of the basic operations. At block 1002, the DCatch system traces access to objects during execution of the distributed system and generates trace results. Block 1004 applies happens-before rules to the trace results to identify candidate operations. Block 1006 identifies concurrent pairs of the candidate operations, each pair accessing a respective common object and having at least one write operation. These candidate pairs represent potential DCbugs. At block 1008, the DCatch system uses run-time analysis tools to identify to determine which potential DCbugs are actual DCbugs.

In the tracing component, 1002, DCatch inserts commands into the distributed computing system to produce a trace file for every relevant thread of the targeted distributed systems at run time. The traces in this file allow a trace analyzer, 1004, to apply HB rules and identify significant potential DCbugs, as described below. In one example system, the tracing component is implemented using WALA™, a static Java® bytecode analysis framework, and/or Javassist™, a dynamic Java bytecode transformation framework. It is contemplated that other bytecode analysis software could be used in place of WALA, for example, the Soot™ Java bytecode analysis framework. Similarly, other dynamic Java bytecode transformation frameworks, such as the ASM™ framework may be used instead of Javaassist. Details of this example implementation are described below with reference to FIG. 10B.

The first example trace component 1052 determines which operations to trace. In one example, DCatch collects information about two basic components of DCbugs: memory accesses and HB-related operations. As described below, the example DCatch also traces lock/unlock operations.

Memory access tracing may be performed, naively, by recording (e.g. logging) all accesses to program variables that could potentially be shared among threads or event handlers. This exhaustive approach, however, may lead to very large logging and trace analysis cost. Fortunately, such excessive logging is unnecessary for DCbug detection because not all of the software needs to be analyzed. In particular, DCbugs are triggered by inter-node interaction, with the root-cause memory accesses mainly in code regions related to inter-node communication and computation.

Following this design principle, the DCatch trace 1052 traces all accesses to heap objects and static variables in the following three types of functions and their callee functions: (1) RPC functions; (2) functions that conduct socket operations; and (3) event-handler functions. The first two are directly related to inter-node communication and corresponding computation. The third type is considered because many pre- or post-processing of RPC calls and socket sending and receiving operations are conducted through event queues and event handlers.

Once the trace operation has traced these operations, DCatch, at block 1054, analyzes the trace and applies HB rules. Following the MTEP happens-before rules described above, the example DCatch system traces operations that allow the trace analyzer to infer happens-before relationships, as shown in TABLE 1.

TABLE 1

| Operation | T-Rule | E-Rule | M-Rule | P-Rule |
|---|---|---|---|---|
| Create (t), Join(t) | ✓ | | | |
| Begin (t), End (t) | ✓ | | | |
| Begin (e) | | ✓ | | ✓ |
| End (e) | | | | ✓ |
| Create (e) | | ✓ | | |
| Begin (r, n) End (r, n) | | | ✓ | |
| Create (r, n) Join (r, n) | | | ✓ | |
| Send (m, $n_1$) Recv (m, $n_2$) | | | ✓ | |
| Update (s, $n_1$) Pushed (s, $n_2$) | | | | ✓ |

The example DCatch system may identify these operations based on corresponding library interfaces at run time using the Javassist infrastructure. An example implementation of this example system is described in more detail below.

Each trace record contains three pieces of information: (1) the type of the recorded operation; (2) the callstack of the recorded operation; and (3) an identifier (ID). The first two pieces of information are straightforward. The ID, however, has different meanings for different types of records. In the example DCatch system, the ID helps DCatch trace analyzer to find related trace records.

For a memory access, the ID may uniquely identify the variable or object touched by this memory access. In one example system, the ID of an object field is represented by the field-offset inside the object and the object hashcode. The ID of a static variable is represented by the variable name and its corresponding namespace.

For lock/unlock operations, the IDs uniquely identify the lock objects, allowing DCatch's triggering module to identify all lock critical sections and perturb the timing at appropriate places.

For HB-related operations, the IDs allow DCatch trace analysis to correctly apply HB rules. For every thread-related and event-related operation, the ID may be an object hashcode of the corresponding thread object and event object, respectively. Each RPC-related and socket-related operation may have a unique ID for each RPC-call instance and each socket-message. These RPC and socket related IDs may be generated by tagging each RPC call and each socket message with a random number at run time. An example implementation of this example system is described in more detail below.

The example DCatch trace analyzer identifies every pair of heap/static-variable accesses, with at least one write operation, that touch the same variable or object and that occur concurrently. In one implementation, operations not linked by an HB relationship, either directly or indirectly are considered to be concurrent. Concurrency may be determined, as described below, using a happens-before graph of the target distributed system. The identified pairs of accesses are considers to be DCbug candidates.

The example DCatch trace analysis includes two steps: happens-before graph construction, block 1056, and DCbug candidate identification, block 1058.

A happens-before graph is a directed acyclic graph (DAG). In this graph, every vertex v represents an operation o(v) recorded in the example DCatch trace, including both memory accesses and HB-related operations. The edges in the graph are arranged in a way that $v_1$ can reach $v_2$ if and only if $o(v_1)$ happens before $o(v_2)$.

To build such a graph, the example DCatch system, at block 1056, first analyzes all trace files collected from all traced threads of all traced processes in all nodes, and makes every record a vertex in the graph. The amount of data to be analyzed is reduced since the only functions traced are RPC functions, functions that conduct socket operations, event-handler functions and their called functions.

Next, DCatch adds edges according to the MTEP happens-before rules, described above and shown in TABLE 1. The materials below describe only the application of the $E^{serial}$ and $M^{pull}$ rules. The application of the other rules are mostly straightforward because the ID inside each trace record allows the trace analysis to easily group related operations together.

To apply the single-consumer event-queue rule ($E^{serial}$), the DCatch HB graph builder 1056 waits until all other HB rules have been applied, which is the only ordering requirement in applying the MTEP HB rules. For every thread that handles a single-consumer event queue, the DCatch graph builder 1056 checks every pair of End ($e_i$) operation and Begin ($e_j$) operation recorded in its trace, and adds an edge from the former to the latter after the DCatch graph builder 1056 finds that Create ($e_i$) to happen before Create ($e_j$) based on those HB edges added so far. DCatch repeats this step until reaching a fixed point.

Applying Rule $M^{pull}$ uses program analysis. The algorithm here is similar to how loop-based custom synchronization is handled in LCbug detection. For every pair of conflicting concurrent read and write {r, w} operations, r is considered to be potentially part of a pull-based synchronization protocol if (1) r is executed inside an RPC function; (2) the return value of this RPC function depends on r; (3) in another node that requests this RPC, the return value of this RPC is part of the exit condition of a loop l. The targeted software is then run again, tracing only such read operations (rs) and all write operations (ws) that touch the same object based on the original trace. The new trace indicates which write operation w* provides value for the last instance of the read operation r before the loop l exits. If the w* and r operations are from different threads, the w* operation in one node happens before the exit of the remote loop l in another node. This part of the analysis is done together with intra-node while-loop synchronization analysis. Although the algorithm runs the software for a second time, the algorithm incurs little tracing or trace analysis overhead, because it focuses on loop-related memory accesses.

After the happens-before graph is built, the DCatch time stamp and concurrency block 1058 can compute a vector time stamp for every vertex in graph and check every pair of memory-access vertices to identify conflicting concurrent accesses to the same memory object. Even with the reduced tracing, this approach may be complex: the number of vertices may be very large, and each vector time-stamp may have a large number of dimensions, with each dimension corresponding to an event handler and/or a RPC function.

To speed up this analysis, DCatch uses an algorithm for asynchronous race detection for non-distributed systems. Briefly, the algorithm first constructs a list containing all the accesses to an object for every memory object that appears in trace files. Then, the algorithm enumerates pairs of accesses in each list where at least one operation in the pair is a write operation. For each such pair, the block 1058 queries the happens-before graph to see if the operations in the pair are concurrent. The basic idea is to compute a reachable set for every vertex in the happens-before graph. Next, the query looks through the reachable set of one vertex to see if the other vertex appears in the resulting set. To save memory space, a bit array may be assigned to each vertex i to represent the reachable set, where the $j^{th}$ bit is set if the vertex i can reach vertex j. The algorithm may then traverse the graph from each vertex i and set a bit for each vertex j encountered during the traversal. After these arrays are constructed, the query can get results in constant time. In other words, concurrence between first and second operations can be determined without adding time stamps to the graph. The algorithm identifies first and second operations as concurrent when the bit representing the vertex of the second operation is not set in the bit array of the vertex corresponding to the first operation.

Block 1058 reports pairs of concurrent conflicting accesses as DCbug candidates. A candidate pair of accesses is conflicting if it accesses the same object with at least one of the accesses being a write operation and it is concurrent if there is no happens-before relationship between the two accesses, as indicated by the vertex bit array. The materials below refer to s and t or (s, t) as the concurrent conflicting operations (accesses) identified in the trace analysis. Not all of the candidates, however, can lead to execution failures. This is particularly true in distributed systems which inherently contain more redundancy and failure tolerance than single-machine systems.

To avoid excessive false positives, given a bug candidate (s, t), the DCatch system, at block 1060, statically analyzes the related Java bytecode of the target system to estimate the potential local (i.e., within one node) and distributed (i.e., beyond one node) impact of this bug candidate, and prunes the ones that are unlikely to cause severe failures.

DCatch pruning block 1060 of the example DCatch system conducts inter-procedural and inter-node impact analysis to better suit the failure-propagation nature of DCbugs in distributed systems. Block 1060 includes a data structure that classifies the failures to identify the failures that are to be considered severe failures. The data structure also identifies what types of instructions are considered failure instructions. Block 1060 can check whether the execution of any failure instructions depends on the bug candidate (s, t).

There may be different definitions of severe failures. In one example DCatch system analyzes the following types of failures and failure instructions: (1) system aborts and exits, the corresponding failure instructions of which are invocations of abort and exit functions (e.g., System.exit and System.abort); (2) severe errors that are printed out or otherwise output, whose corresponding failure instructions are invocations of Log::fatal and Log::error functions in the studied systems; (3) throwing uncatchable exceptions (using the Java Throw statement), such as RuntimeException; (4) infinite loops, where every loop-exit instruction is considered as a potential failure instruction. Finally, if any identified failure instructions is inside a catch block, block 1060 consider the corresponding exception throw instruction, if available, as a failure instruction.

The above list is configurable, which allows the example DCatch pruning block 1060 to be configured to detect DCbugs with different types of impact.

To determine whether an identified DCbug is a severe failure, the DCatch pruning block 1060, DCatch analyzes the program bytecode for every bug report (s, t) to see whether either s or t may have local (i.e., intra-node) or distributed (i.e., inter-node) impact towards the occurrence of any failure instructions.

Pruning block 1060 conducts both intra-procedural and inter-procedural analysis for local impact analysis. Given a memory-access statement s located in method M, block 1060 first checks whether any failure instruction in M has control- or data-dependence on s. Block 1060 applies similar checking for t. If block 1060 finds such a depending failure instruction for either s or t, DCatch keeps the corresponding bug candidate in its bug-report list.

Block 1060 then checks whether s could affect failure instructions inside the callers of M through either the return value of M or heap/global objects accessed by M. Note that, from the DCatch tracer and trace analysis report call-stack information, the inter-procedural analysis performed in block 1060 may follow the reported call-stack of s.

To determine the impact through return values, Block 1060 checks whether the return value of M has control or data dependence on s. If so, Block 1060 continues to check whether any failure instructions in the function that called M depend on the return value of M. Block 1060 follows the call-stack of s to perform similar analysis along the call chain.

Checking the impact through heap/global variables may be more complicated. Block 1060 first checks whether there exists any heap write w that has data dependency or control dependency on s inside the method M. For every such w that writes to object o, DCatch checks the caller of M, denoted as M', to see if there exists any read, r, of o that satisfies all the following conditions: (1) the read, r, exists along a path from the callsite of M to a failure instruction; (2) that failure instruction has control-dependency or data-dependency upon the read r. Given the complexity and in-accuracy concerns (due to alias and others), DCatch only applies this analysis to one-level caller of M, not further up the call chain.

Finally, block 1060 checks whether s could affect failure sites in the called functions of M (also known as "callee functions") through either function-call parameters or heap/global variables. This analysis is also only applied to the one-level callee functions of M.

In addition to intra-node analysis, block 1060 also performs inter-node analysis. As shown in FIG. 2B, an access in one node may lead to a failure in a different node. Therefore, DCatch also analyzes RPC functions to understand the remote impact of a memory access.

Specifically, after block 1060 finds an RPC function R along the call-stack of the memory access s, it checks whether the return value of R depends on s. If so, block 1060 then locates the function $M_r$ on a different node that invokes the RPC call R. Inside $M_r$, Block 1060 also checks whether any failure instruction depends on the return value of R. Note that locating $M_r$ is straightforward given the DCatch run-time trace.

Theoretically, block 1060 can also analyze inter-node impact through sockets. However, socket communication may not be as structured as RPC invocations, and, thus, it may be more difficult to identify the corresponding fine-granularity dependency information without developers annotation.

Finally, for a DCbug candidate (s, t), if block 1060 fails to find any failure impact for s and t, block 1060 prunes the DCbug candidate from the DCatch bug list. In one example system, the above implementation is done in WALA code analysis framework, leveraging WALA APIs that build program dependency graphs.

The DCbug candidates reported so far still may not be truly harmful for two reasons. First, some reported access pairs may not be truly concurrent with each other—their execution order may be fixed by custom synchronization that was not identified by DCatch. Second, some truly concurrent conflicting access pairs may be benign—executing the two accesses in different order may not lead to any failure. Note that, the failure impact analysis described above is only a static estimation, and, hence, may be wrong. Furthermore, even for those truly harmful DCbug candidates, triggering them could be very challenging in distributed systems.

To help prune false positives and reliably expose truly harmful DCbugs, the last component of DCatch, the testing and triggering blocks 1062 and 1064, provides support for testing distributed systems and triggering DCbugs. It includes two parts: (1) an infrastructure that enables easy timing manipulation in distributed systems; and (2) an analysis tool that suggests how to use the infrastructure to trigger a DCbug candidate.

Figure 11:
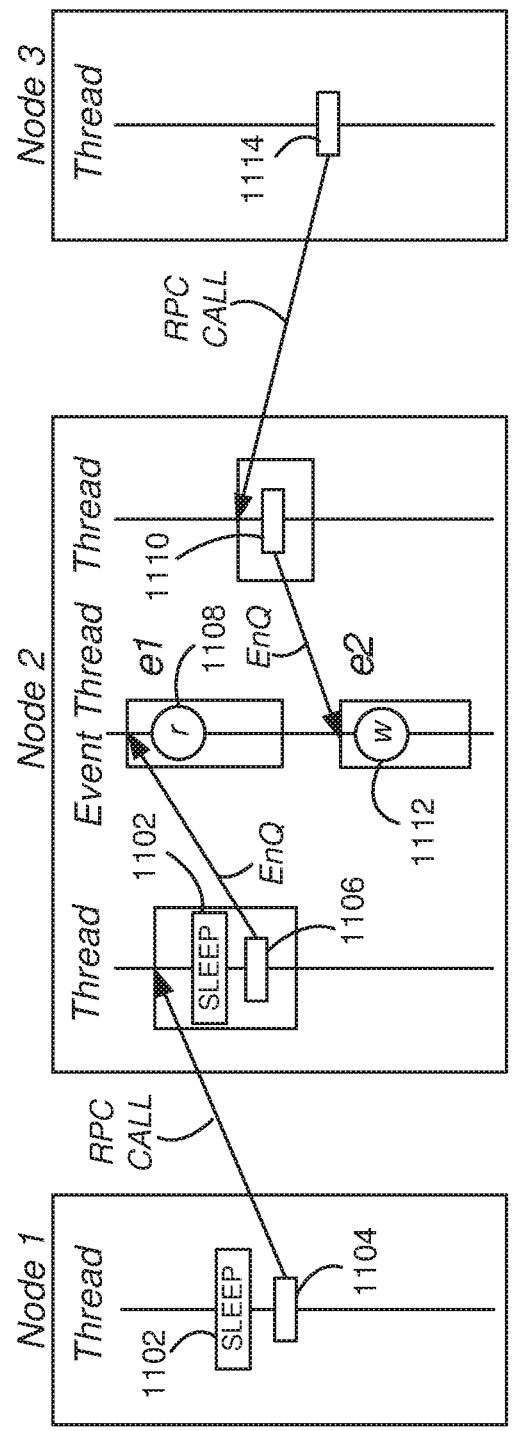
FIGS. 11 and 12 are timing diagrams illustrating example techniques for triggering run-time concurrency errors according to various embodiments.

The DCatch system could perturb the timing of execution by inserting sleep intervals into the program as shown in FIG. 11. FIG. 11 is a timing diagram showing example techniques for triggering run-time concurrency errors. As shown in FIG. 11, sleep states 1102 are selectively introduced right before any one or both of the RPC call 1104 in node 1, and the enqueuing operations 1106 for the event 1108 in node 2. Each of the inserted sleep states is long enough to flip the execution order between 1108 and 1112 in node 2 if the flipping is possible and to trigger an error if one exists. If the order between events 1108 and 1112 cannot be flipped or if it can be flipped and yet no error is detected, then these two operations 1108 and 1112 may be pruned from the list of DCbug candidates. This approach, however may not be an effective way to detect complicated bugs in complicated systems, because it is hard to know how long the sleep intervals need to be. A more sophisticated approach may run the entire program in one processor core and control the timing through a thread scheduler. Neither of these approaches works well for DCbugs, however, which may require manipulating the timing among operations from different nodes. It may be impractical to run real-world large distributed systems on one processor core.

One example DCatch infrastructure includes two components: client-side APIs for sending coordination-request messages and a message-controller server. In the materials below, the distributed system under testing is referred to as the client.

Consider analyzing a pair of concurrent operations A and B. the testing and triggering blocks 1062 and 1064, described above with reference to FIG. 10B, may explore executing A right before B and also B right before A. One way in which this may be implemented is for block 1062 to place a _request API call before A and a _confirm API call right after A, and to place similar instructions before and after B. At run time, the _request API may send a message to the controller server to ask for permission to continue execution. The controller, at block 1064 waits for the request-message to arrive from both parties, and then grants permission to one party, waits for the confirm-message sent by the respective _confirm API, and then grant the permission for the remaining party. The controller may keep a record of what ordering has been explored and may re-start the system several times (block 1066), until all ordering permutations among all the request parties (just two in this example) are explored. A controller may keep a record of the permutations that have been tried and restart the system several times until all permutations have been tested. The system may then terminate at block 1068. One such example is shown in FIG. 12.

Figure 12:
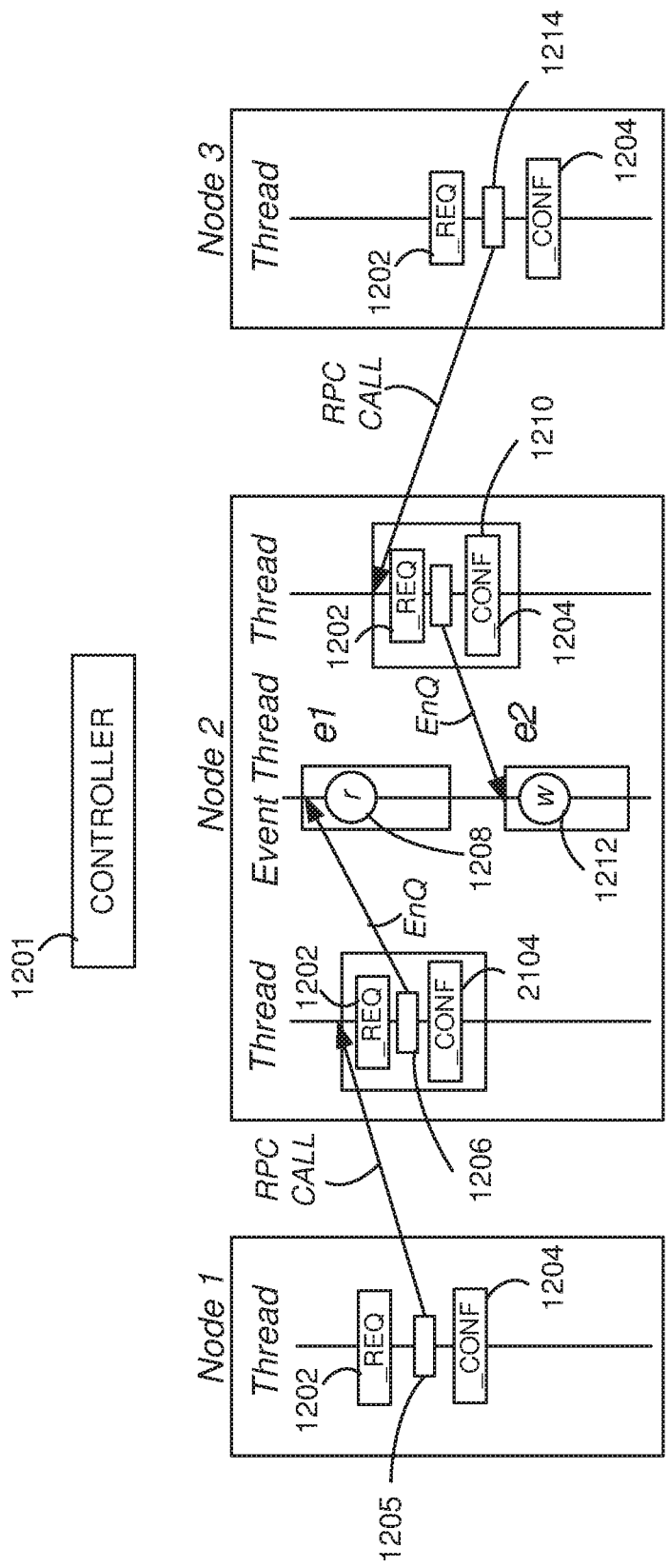

FIG. 12 is a timing diagrams showing example techniques for triggering run-time concurrency errors. In this example, _request API blocks 1202 are inserted before the RPC call blocks 1204 and 1214 and _confirm API blocks 1204 are inserted after the RPC call blocks 1205 and 1214. A controller 1201 may cause the RPC calls, and consequently operation 1208 and operation 1212, to be executed in any order to determine if they result in an error. Alternatively, or in addition, _request blocks 1202 may be inserted before, and _confirm blocks 1204 may be inserted after the enqueuing operations 1206 and 1208. The inserted _request and _confirm API blocks result in the operations 1208 and 1212 being initiated in different order. If no error is detected then the bug candidate pair (1208, 1212) may be pruned from the list of DCbug candidates. If a serious error manifests during this process, the DCbug candidate may be retained in the list.

The examples described below provide two implementations for this controller server: one is in truly distributed mode, which communicates with the testing client running on different machines through sockets; the other is in single-machine mode, which communicates with the testing client running in different processes on the same machine through file operations.

With the infrastructure described above, the remaining question is where to put the _request and _confirm APIs given a DCbug report (s, t). The _confirm APIs can be inserted right after the heap access in the bug report. Therefore, the materials below focus on the placement of _request APIs.

One solution, as shown in FIG. 12, may be to put the _request right before s and t. This approach, however, sometimes does not work, either because it leads to hangs, or because it causes too many _request messages to be sent to the controller server due to the large number of dynamic instances of s/t. One example DCatch system may be configured according to the following analysis to help solve this problem.

First, the DCatch system may warn about potential hangs caused by poor placements of the _request APIs and may suggest one or more non-hang placements. Specifically, when s and t are both inside event handlers and their event handlers correspond to a single-consumer queue, the DCatch system may warn the user of hangs and suggest inserting the _request APIs in the corresponding event enqueue functions, instead. Similarly, ifs and t are both inside RPC handlers and their RPC functions are executed by the same RPC handling thread in the same node, DCatch may suggest inserting the _request APIs in corresponding functions that initiate the RPCs. If s and t are inside critical sections guarded by the same lock, DCatch may suggest inserting a _request right before the corresponding critical sections. DCatch may obtain this critical section information based on lock-related records in its trace, as described above.

Second, DCatch may issue a warning after it finds large number of dynamic instances of s and t and may suggest better placements. For example, the DCbug report may contain the call-stacks for s and t and the DCatch system may check the run-time trace to determine whether the report contains a large number of dynamic instances of the corresponding call-stack for s (the analysis for t is the same). In these instances, DCatch may check its happens-before graph to find an operation o in a different node that causes s, and check whether o is a better place for the _request. This analysis is effective, as many event handlers and RPC functions may be executed under the same call stack, and hence could make bug triggering very complicated without this support from the DCatch system. It is noted that both of the features described above are unique to triggering DCbugs.

An example implementation of the DCatch system is described below. HB-related operation tracing may be implemented using Javassist, or other dynamic Java bytecode re-writing tool, which allows analysis and instrumentation of Java bytecode whenever a class is loaded.

HB-related operations involve functions related to thread, event-handling, RPCs, sockets, and inter-node notification protocols, as described above. All thread-related operations can be easily identified following the java.lang.Thread interface. Other operations are supported by slightly different interfaces across different systems.

In one example, event handling is implemented using java.beans.EventHandler interface in both Hadoop and HBase. The prototype of an event handler function is EventHandler::handle (Event e), where the content of the parameter determines the event handling action. Cassandra and Zookeeper use their own event-handling interfaces. The way event handler functions are implemented and invoked are similar to the implementation and invocation in Hadoop and HBase.

For RPC, HBase and later versions of Hadoop share the same RPC library interface, VersionedProtocol. All methods declared under classes instantiated from this interface are RPC functions, and hence can be easily identified by the DCatch system. Later versions of Hadoop use a slightly different RPC interface, ProtoBase, which identifies RPC functions in the same way as VersionedProtocol.

For socket sending and receiving, Cassandra has a super-class IVerbHandler to handle socket communication and the sending of is conducted by a function, IVerbHandler::sendOneWay (Message, EndPoint). Thus, the DCatch system can easily identify all such socket message sending function calls, as well as the corresponding message objects. Zookeeper uses a super-class Record for all socket messages. Every socket sending is preceded by a new instance of a Record object, and is conducted through socket::write(Record). Thus, socket messages can also be easily identified.

One example DCatch system first uses WALA, a static Java bytecode analysis framework, to statically analyze the target software, identify all RPC/socket/event related functions, and store the analysis result in a file DFunctionList for later run-time analysis use. The example DCatch system then uses Javassist to insert tracing functions before every heap or static variable access as described above. Specifically, the DCatch system may use a Javassist plugin that conducts the following operations whenever a class C is loaded into JVM: (1) identify all methods in C that are part of DFunctionList; (2) for each such method function, identify all getfield/putfield instructions (e.g., heap accesses) and getstatic/putstatic instructions (e.g., static-variable accesses); (3) for each such instruction, insert a tracing function before the instruction, where the tracing function produces a trace record.

The example DCatch system records a unique ID for each package sent/received through a socket communication and via each RPC call. To achieve this the system, at the socket sending or RPC calling side, generates a random number and sends the random number together with the socket message or RPC call. At the receiving side, the system parses the random number and puts it into the corresponding trace record. Specifically, the DCatch system statically transforms the target software, adding one extra parameter for every RPC/socket-sending function and inserting the code to generate a random value for each such parameter at RPC/socket-sending invocation.

As described above, the DCatch system may be adapted to any distributed processing system with knowledge of the following: (1) what is the RPC interface; (2) what APIs are used for socket messaging; (3) what APIs are used for the event enqueue/dequeue/handler; (4) whether the event queues are FIFO and whether they have one or multiple handler threads. Providing the above specifications should be straightforward and reasonably easy, because only a relatively small number of (RPC/event/socket) interfaces or prototypes are identified, instead of a relatively large number of instance functions. The above specifications are desirable for accurate DCbug detection in existing distributed systems.

The DCatch rules are easily adapted to the distributed processing system once these items are known. To implement DCatch on a distributed processing system, the components of the processing system are first modified using a static and/or dynamic bytecode transformation/analysis framework, such as WALA and/or Javassist, to insert commands used to trace access to objects in RPC functions, functions that conduct socket operations and event handler functions. The modified system is then run on a multi-node system to trace the functions accessing the objects. The DCatch system then analyzes the trace to build the graph and identify candidate pairs of operations that potentially cause DCbugs. The components of the processing system are then analyzed again to prune potential DCbugs that do not extend across multiple nodes. The system is again modified to insert delays (e.g. sleep states) and/or _request and _confirm APIs to adjust system timing. The modified system is executed multiple times to try different permutations of the candidate pairs of operations to determine which potential DCbugs can actually occur.

The functions or algorithms described herein may be implemented using software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a computing system such as a digital signal processor, ASIC, microprocessor, mainframe processor or other type of processor operating on a computer system, such as a personal computer, server or other computing system, turning such computing system into a specifically programmed machine.

Figure 13:
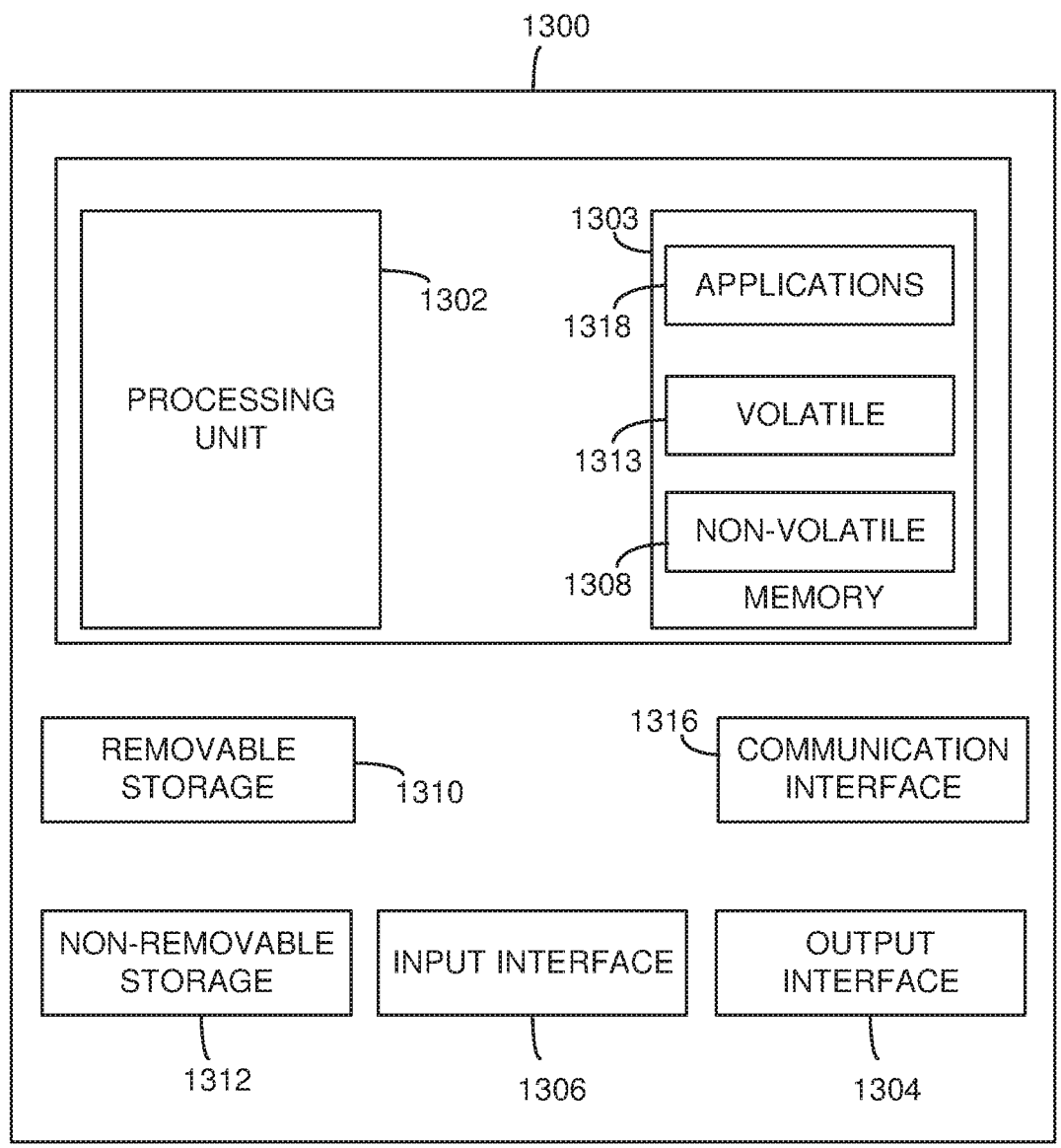
FIG. 13 is a block diagram of an example server that may be used as any of the described examples.

FIG. 13 is a block diagram illustrating computing circuitry for clients, servers, and cloud based computing system resources for implementing algorithms and performing methods according to example embodiments. The distributed computing system may include multiple instances of the circuitry shown in FIG. 13 and include the DCatch system, described above. All components need not be used in various embodiments. For example, each of the clients, servers, and network resources of the distributed computing system may each use a different set of components, or in the case of servers or mainframes, for example, larger storage devices.

One example computing system in the form of a computer 1300 may include a processing unit 1302, memory 1303, removable storage 1310, and non-removable storage 1312. The processing unit 1302 may be a single core or multi-core device. Although the example computing system is illustrated and described as computer 1300, the computing system may be in different forms in different embodiments. For example, the computing system may instead be a smartphone, a tablet, smartwatch, or other computing device including the same or similar elements as illustrated and described with regard to FIG. 13. Devices, such as smartphones, tablets, and smartwatches, are generally collectively referred to as mobile devices or user equipment. Further, although the various data storage elements are illustrated as part of the computing system 1300, the storage may also or alternatively include cloud-based storage accessible via a network, such as a local area network (LAN), a personal area network, (PAN) a wide area network (WAN) such as the Internet, or local server based storage.

Memory 1303 may include volatile memory 1314 and non-volatile memory 1308. Computer 1300 may include— or have access to a computing environment that includes—a variety of computer-readable media, such as volatile memory 1314 and non-volatile memory 1308, removable storage 1310 and non-removable storage 1312. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1300 may include or have access to a computing environment that includes input interface 1306, output interface 1304, and a communication connection or interface 1316. Output 1304 may include a display device, such as a touchscreen, that also may serve as an input device. The input 1306 may include one or more of a touchscreen, touchpad, mouse, keyboard, camera, one or more device-specific buttons, one or more sensors integrated within or coupled via wired or wireless data connections to the computing system 1300, and other input devices. The computer may operate in a networked environment using a communication connection to connect to one or more remote computers, such as mainframes and/or database servers. The remote computer may include a personal computer (PC), server, router, network PC, a peer device or other common network node, or the like. The communication connection may include a Local Area Network (LAN), a Wide Area Network (WAN), cellular, Wi-Fi, Bluetooth, or other networks.

Computer-readable instructions stored on a computer-readable medium are executable by the processing unit 1302 of the computer 1300. A hard drive, CD-ROM, and RAM are some examples of articles including a non-transitory computer-readable medium such as a storage device. The terms computer-readable medium and storage device do not include carrier waves to the extent carrier waves are deemed too transitory. For example, a computer program 1318 may be used to cause processing unit 1302 to perform one or more methods or algorithms described herein.

What is claimed is:

1. A method of predicting distributed concurrency errors in a distributed computing system configured to execute on a plurality of component computers, the method comprising: tracing candidate operations in the distributed computing system that access objects during execution of the distributed computing system to generate trace results;

applying a predetermined set of happens-before rules to the trace results to determine timing relationships among the candidate operations that access respective common objects, each happens-before rule of the predetermined set of happens-before rules indicating a first type of operation that happens before a second type of operation, wherein the predetermined set of happens-before rules includes rules for inter-node communication, intra-node asynchronous event processing, and intra-node multi-threaded computation and synchronization;

building an ordered graph of the candidate operations, each vertex in the graph representing one of the candidate operations and each edge between two vertexes in the graph representing one of the happens-before rules between the candidate operations represented by the two vertexes, assigning a bit array to each vertex, each bit in the bit array representing a respective vertex in the graph;

for each vertex, traversing the graph and, upon reaching each further vertex during the traversal of the graph, setting a bit corresponding to the further vertex in the bit array of the vertex;

identifying one or more concurrent pairs of the candidate operations, each identified concurrent pair of candidate operations accessing a respective one of the common objects, to generate a list of potential distributed concurrency errors, wherein identifying first and second candidate operations as being a concurrent pair of candidate operations includes determining that a bit corresponding to the second candidate operation is not set in the bit array of the first candidate operation; and using the one or more concurrent pairs of candidate operations, identifying, during execution of the distributed computing system, respective orders of conflicting memory accesses among the plurality of component computers that result in actual distributed concurrency errors, wherein, during a further execution of the distributed computing system, the component computers execute the distributed computing system such that the one or more concurrent pairs of candidate operations are executed in an order that does not result in any of the actual distributed concurrency errors.

2. The method of claim 1, wherein the predetermined set of happens-before rules comprise message rules wherein the first type of operation and the second type of operation include message operations between two nodes, thread rules wherein the first type of operation and the second type of operation include thread operations initiated from different nodes, event rules wherein the first type of operation and the second type of operation include event operations accessed by different threads, and program ordering rules concerning execution order of operations of the first type of operation and the second type of operation in different threads.

3. The method of claim 1, wherein:

identifying the one or more concurrent pairs of candidate operations includes identifying respective pairs of the candidate operations from respectively different threads that access the respective common objects and include at least one respective write operation.

4. The method of claim 1, wherein tracing the candidate operations that access objects includes exclusively tracing remote procedure call (RPC) functions, functions that conduct socket operations, and event handler functions.

5. The method of claim 1, further comprising analyzing each concurrent pair of candidate operations used to generate the list of potential distributed concurrency errors to delete, from the list, concurrent pairs of candidate operations of the one or more concurrent pairs of candidate operations that are unlikely to cause severe failures.

6. The method of claim 5, wherein, for each concurrent pair of candidate operations, the respective common object accessed by the concurrent pair of candidate operations is located in a first node and the method further comprises analyzing one or more portions of the distributed computing system in which the concurrent pair of candidate operations occurs to determine whether a distributed concurrency error caused by out-of-order execution of the concurrent pair of candidate operations has an effect in a second node different from the first node.

7. The method of claim 1, further comprising modifying threads of the distributed computing system to determine a relative timing of each candidate operation in each of the concurrent pairs of candidate operations during execution of the distributed computing system to identify the actual distributed concurrency errors.

8. The method of claim 1, further comprising modifying threads of the distributed computing system to adjust relative timing of selected candidate operations in the concurrent pairs of candidate operations during execution of the distributed computing system to cause actual distributed concurrency errors in order to determine a timing sensitivity of the selected candidate operations.

9. A non-transitory computer readable medium comprising instructions, that, when executed by a processor, configure the processor to:
 trace candidate operations in a distributed computing system that access objects during execution of the distributed computing system to generate trace results;
 apply a predetermined set of happens-before rules to the trace results to determine timing relationships among the candidate operations that access respective common objects, each happens-before rule of the predetermined set of happens before rules indicating a first type of operation that happens before a second type of operation, wherein the predetermined set of happens-before rules includes rules for inter-node communication, intra-node asynchronous event processing, and intra-node multi-threaded computation and synchronization;
 build an ordered graph of the candidate operations, each vertex in the graph representing one of the candidate operations and each edge between two vertexes in the graph representing one of the happens-before rules between the candidate operations represented by the two vertexes,
 assign a bit array to each vertex, each bit in the bit array representing a respective vertex in the graph;
 for each vertex, traverse the graph and, upon reaching each further vertex during the traversal of the graph, set a bit corresponding to the further vertex in the bit array of the vertex;
 identify one or more concurrent pairs of the candidate operations each identified concurrent pair of candidate operations accessing a respective one of the common objects to generate a list of potential distributed concurrency errors, wherein identifying first and second candidate operations as being a concurrent pair of candidate operations includes determining that a bit corresponding to the second candidate operation is not set in the bit array of the first candidate operation; and
 during execution of the distributed computing system, adjust an order of occurrence for selected candidate operations in the one or more concurrent pairs of candidate operations corresponding to each respective potential distributed concurrency error occur to confirm the potential distributed concurrency error as an actual distributed concurrency error, wherein,
 during a further execution of the distributed computing system the distributed computing system executes the selected candidate operations in an order of occurrence that does not correspond to any of the actual distributed concurrency errors.

10. The non-transitory computer readable medium of claim 9, further comprising instructions that configure the processor to identify, as the concurrent pairs of candidate operations, respective pairs of the candidate operations from respectively different threads that access the respective common objects and include at least one respective write operation.

11. The non-transitory computer readable medium of claim 9, further comprising instructions that configure the processor to exclusively trace, as the candidate operations, remote procedure call (RPC) functions, functions that conduct socket operations, and event handler functions.

12. The non-transitory computer readable medium of claim 9, further comprising instructions that configure the processor to analyze the one or more concurrent pairs of candidate operations used to generate the list of potential distributed concurrency errors to delete, from the list, concurrent pairs of candidate operations that are unlikely to cause severe failures.

13. The non-transitory computer readable medium of claim 12, further comprising instructions that configure the processor to, for each concurrent pair of candidate operations, responsive to the respective common object accessed by the concurrent pair of candidate operations being located in a first node, analyze one or more portions of the distributed computing system in which the concurrent pair of candidate operations occurs to determine whether a distributed concurrency error caused by out-of-order execution of the concurrent pair of candidate operations has an effect in a second node different from the first node.

14. A method for processing components of a distributed computing system to predict distributed concurrency errors, the method comprising:
 generating a trace distributed computing system by inserting trace commands into the distributed computing system, the trace commands tracing access to trace objects accessed by candidate operations including RPC functions, functions that conduct socket operations, and event handler functions;
 executing the trace distributed computing system to collect trace data;
 applying a predetermined set of happens-before rules to the trace data to determine timing relationships among the candidate operations that access respective common objects, each happens-before rule of the predetermined set of happens-before rules indicating a first type of operation that happens before a second type of operation, wherein the predetermined set of happens-before rules includes rules for inter-node communication, intra-node asynchronous event processing, and intra-node multi-threaded computation and synchronization;

analyzing the trace data to build a graph having vertexes corresponding to the candidate operations that access the trace objects and edges corresponding to the predetermined set of happens-before rules connecting the candidate operations;

analyzing the graph to identify one or more pairs of concurrent candidate operations;

analyzing the one or more pairs of concurrent candidate operations to generate a list of potential distributed concurrency errors, the list including each of the one or more pairs of concurrent candidate operations that includes a write operation and that accesses a respective common trace object wherein the analyzing the candidate operations to generate the list of potential distributed concurrency errors includes:

assigning a bit array to each vertex, each bit in the bit array representing a respective vertex in the graph;

for each vertex, traversing the graph and, upon reaching each further vertex durinq the traversal of the graph, setting a bit corresponding to the further vertex in the bit array of the vertex; and identifying first and second candidate operations as being a concurrent pair of candidate operations includes determining that a bit corresponding to the second candidate operation is not set in the bit array of the first candidate operation;

modifying the distributed computing system to provide a distributed computing system having adjustable timing;

executing multiple times, the distributed computing system having adjustable timing while adjusting the timing by inserting respective sleep state before one candidate operation of each of the one or more candidate pairs of operations in the list of potential distributed concurrency errors to identify which of the candidate pairs of operations in the list of potential distributed concurrency errors produce actual distributed concurrency errors, wherein, during a further execution of the distributed computing system, the distributed computing system executes the one or more candidate pairs of operations determined to produce the actual concurrency errors with a timing that does not produce any of the actual distributed concurrency errors.

15. The method of claim 14, wherein building the happens-before graph includes building a directed acyclic graph.

16. The method of claim 15, wherein modifying the distributed computing system includes using at least one of a static bytecode analysis framework or a dynamic bytecode transformation framework.

17. Apparatus comprising:

a memory comprising instructions; and one or more processors configured to execute a distributed computing system, the one or more processors in communication with the memory, wherein the one or more processors are configured to execute the instructions to:

trace candidate operations in the distributed computing system that access objects during execution of the distributed computing system to generate trace results;

apply a predetermined set of happens-before rules to the trace results to determine timing relationships among the candidate operations that access respective common objects, each happens-before rule of the predetermined set of happens-before rules indicating a first type of operation that happens before a second type of operation, wherein the predetermined set of happens-before rules includes rules for inter-node communication, intra-node asynchronous event processing, and intra-node multi-threaded computation and synchronization;

build an ordered graph of the candidate operations, each vertex in the graph representing one of the candidate operations and each edge between two vertexes in the graph representing one of the happens-before rules between the candidate operations represented by the two vertexes, assign a bit array to each vertex, each bit in the bit array representing a respective vertex in the graph;

for each vertex, traverse the graph and, upon reaching each further vertex during the traversal of the graph, set a bit corresponding to the further vertex in the bit array of the vertex;

identify one or more concurrent pairs of the candidate operations, each identified concurrent pair of candidate operations accessing a respective common object to generate a list of potential distributed concurrency errors, wherein identifying first and second candidate operations as being a concurrent pair of candidate operations includes determining that a bit corresponding to the second candidate operation is not set in the bit array of the first candidate operation;

adjust, during execution of the distributed computing system, an order of occurrence for selected candidate operations in the one or more concurrent pairs of candidate operations corresponding to each respective potential distributed concurrency error occur to confirm the potential distributed concurrency error as an actual distributed concurrency error, wherein, during a further execution of the distributed computing system, the distributed computing system executes the one or more concurrent pairs of candidate operations in an order of occurrence that does not correspond to any of the actual distributed concurrency errors.

18. The apparatus of claim 17, wherein the one or more processors are further configured by the instructions to identify, as the one or more concurrent pairs of candidate operations, respective pairs of the candidate operations from respectively different threads that access the respective common objects and include at least one respective write operation.

19. The apparatus of claim 17, wherein the one or more processers are further configured by the instructions to exclusively trace, as the candidate operations, remote procedure call (RPC) functions, functions that conduct socket operations, and event handler functions.

20. The apparatus of claim 17, wherein the one or more processers are further configured by the instructions to:

analyze the one or more concurrent pairs of candidate operations used to generate the list of potential distributed concurrency errors to delete, from the list, concurrent pairs of candidate operations that are unlikely to cause severe failures.

21. The apparatus of claim 20, wherein the one or more processers are further configured by the instructions to:

for each concurrent pair of candidate operations of the one or more concurrent pairs of candidate operations, responsive to the respective common object accessed by the concurrent pair of candidate operations being located in a first node, analyze one or more portions of the distributed computing system in which the concurrent pair of candidate operations occurs to determine whether a distributed concurrency error caused by out-of-order execution of the concurrent pair of candidate operations has an effect in a second node different from the first node.

22. An apparatus for processing components of a distributed computing system to predict distributed concurrency errors, the apparatus comprising:
a memory comprising instructions; and
one or more processors in communication with the memory wherein the one or more processors are configured to execute the instructions to:
insert trace commands into the distributed computing system to generate a trace distributed computing system, the trace commands tracing access to trace objects accessed by candidate operations including RPC functions, functions that conduct socket operations, and event handler functions;
execute the trace distributed computing system to collect trace data;
apply a predetermined set of happens-before rules to the trace data to determine timing relationships among the candidate operations that access respective common objects, each happens-before rule of the predetermined set of happens-before rules indicating a first type of operation that happens before a second type of operation, wherein the predetermined set of happens-before rules includes rules for inter-node communication, intra-node asynchronous event processing, and intra-node multi-threaded computation and synchronization;
analyze the trace data to build a graph having vertexes corresponding to the candidate operations that access the trace objects and edges corresponding to the predetermined set of happens-before rules connecting the candidate operations;
analyze the graph to identify one or more pairs of concurrent candidate operations;
analyze the one or more pairs of concurrent candidate operations to generate a list of potential distributed concurrency errors, the list including each of the one or more pairs of concurrent candidate operations that includes a write operation and that accesses a respective common trace object, wherein to analyze the candidate operations to generate a list of potential distributed concurrency errors, the one or more processors are configured to execute the instructions to:
assign a bit array to each vertex, each bit in the bit array representing a respective vertex in the graph;
for each vertex, traverse the graph and, upon reaching each further vertex during the traversal of the graph, set a bit corresponding to the further vertex in the bit array of the vertex; and
identify first and second candidate operations as being a concurrent pair of candidate operations by determining that a bit corresponding to the second candidate operation is not set in the bit array of the first candidate operation;
modify the distributed computing system to provide a distributed computing system having adjustable timing;
execute multiple times, the distributed computing system having adjustable timing while adjusting the timing by inserting respective sleep states before one candidate operation of each of the one or more candidate pairs of operations in the list of potential distributed concurrency errors to identify which of the candidate pairs of operations in the list of potential distributed concurrency errors result in actual distributed concurrency errors, wherein,
during a further execution of the distributed computing system, the distributed computing system executes the one or more candidate pairs of operations determined to result in actual distributed concurrency errors with a timing that does not result in any of the distributed concurrency errors.

23. The apparatus of claim 22 further comprising:
at least one of a static bytecode analysis framework or a dynamic bytecode transformation framework for modifying the distributed computing system.

* * * * *